United States Patent
Noh et al.

(10) Patent No.: US 11,271,621 B2
(45) Date of Patent: Mar. 8, 2022

(54) METHOD AND APPARATUS FOR NON-COHERENT JOINT TRANSMISSION IN WIRELESS COMMUNICATION SYSTEM

(71) Applicant: Samsung Electronics Co., Ltd., Suwon-si (KR)

(72) Inventors: Hoondong Noh, Suwon-si (KR); Youngwoo Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 16/665,723

(22) Filed: Oct. 28, 2019

(65) Prior Publication Data
US 2020/0136690 A1    Apr. 30, 2020

(30) Foreign Application Priority Data
Oct. 26, 2018  (KR) ........................ 10-2018-0129344

(51) Int. Cl.
| | |
|---|---|
| *H04B 7/0456* | (2017.01) |
| *H04W 72/04* | (2009.01) |
| *H04W 80/08* | (2009.01) |
| *H04L 5/00* | (2006.01) |
| *H04B 7/0452* | (2017.01) |
| *H04B 7/06* | (2006.01) |
| *H04B 7/024* | (2017.01) |
| *H04W 72/12* | (2009.01) |

(52) U.S. Cl.
CPC ......... *H04B 7/0473* (2013.01); *H04B 7/0452* (2013.01); *H04B 7/0626* (2013.01); *H04L 5/0051* (2013.01); *H04L 5/0092* (2013.01); *H04W 72/042* (2013.01); *H04W 80/08* (2013.01)

(58) Field of Classification Search
None
See application file for complete search history.

(56) References Cited

U.S. PATENT DOCUMENTS

| | | |
|---|---|---|
| 10,524,245 B2 | 12/2019 | Lee et al. |
| 2011/0255483 A1 | 10/2011 | Xu et al. |
| 2016/0227520 A1 | 8/2016 | Davydov et al. |

(Continued)

FOREIGN PATENT DOCUMENTS

| | | |
|---|---|---|
| KR | 10-2018-0072764 A | 6/2018 |
| WO | 2018/071094 A1 | 4/2018 |
| WO | 2018/082640 A1 | 5/2018 |

OTHER PUBLICATIONS

International Search Report dated Feb. 4, 2020, issued in International Application No. PCT/KR2019/014252.

*Primary Examiner* — Jay L Vogel
(74) *Attorney, Agent, or Firm* — Jefferson IP Law, LLP

(57) ABSTRACT

A method, performed by a terminal, of supporting non-coherent joint transmission in a wireless communication system is provided. The method includes receiving information about a precoding resource block group configuration, receiving at least one of downlink control information or a higher layer signal, and determining sizes of precoding resource block groups applied to a plurality of transmission blocks received from a plurality of transmission and reception points (TRPs) based on the precoding resource block group configuration and at least one of the downlink control information or the higher layer signal.

19 Claims, 29 Drawing Sheets

(56) References Cited

U.S. PATENT DOCUMENTS

| | | | |
|---|---|---|---|
| 2020/0052866 A1* | 2/2020 | Manolakos | H04L 5/00 |
| 2020/0067665 A1* | 2/2020 | Dou | H04L 5/0094 |
| 2020/0119858 A1* | 4/2020 | Ren | H04W 72/04 |
| 2020/0374017 A1* | 11/2020 | Dou | H04B 17/27 |
| 2021/0092720 A1* | 3/2021 | Haghighat | H04B 7/0456 |
| 2021/0100022 A1* | 4/2021 | Zhang | H04B 7/024 |
| 2021/0127374 A1* | 4/2021 | Matsumura | H04L 5/0094 |

\* cited by examiner

BEAM SWEEPING FOR
TRANSMISSION BEAM SELECTION

FIG. 16

METHOD AND APPARATUS FOR NON-COHERENT JOINT TRANSMISSION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0129344, filed on Oct. 26, 2018, in the Korean Intellectual Property Office, the disclosure of which is incorporated by reference herein in its entirety.

BACKGROUND

1. Field

The disclosure relates to a wireless communication system. More particularly, the disclosure relates to operations of a terminal and a base station needed when the terminal is connected to different base stations for downlink and uplink transmissions.

2. Description of Related Art

In order to meet the increasing demand with respect to wireless data traffic because of the commercialization of 4G communication systems, efforts have been made to develop improved 5G communication systems or pre-5G communication systems. For this reason, 5G communication systems or pre-5G communication systems are called Beyond 4G network communication systems or Post Long Term Evolution (LTE) systems. In order to achieve a high data rate, consideration is given to implementing 5G communication systems in millimeter wave (mmW) frequency bands (e.g., 60 GHz bands). In order to reduce propagation path loss and increase a propagation distance in millimeter wave frequency bands, in 5G communication systems, discussions are underway about technologies such as beamforming, massive multiple-input multiple-output (MIMO), full dimensional MIMO (FD-MIMO), array antenna, analog beamforming, and large scale antenna. Also, in order to improve networks of systems, in 5G communication systems, development of technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation is underway. Furthermore, in 5G communication systems, development of an advanced coding modulation (ACM) scheme such as hybrid frequency shift keying (FSK) and quadrature amplitude modulation (QAM) modulation (FQAM) or sliding window superposition coding (SWSC) and an enhanced network access scheme such as filter bank multi carrier (FBMC), non-orthogonal multiple access (NOMA), or sparse code multiple access (SCMA) is underway.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as a sensor network, machine to machine (M2M) communication, or machine type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 5G technology and IoT technology.

Because mobile communication systems may provide various services due to the development of the mobile communication systems, there is demand for methods of effectively providing joint transmission methods.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a non-coherent joint transmission method in a wireless communication system.

Additional aspects will be set forth in part in the description which follows and, in part, will be apparent from the description, or may be learned by practice of the presented embodiments.

According to an aspect of the disclosure, a method, performed by a terminal, of supporting non-coherent joint transmission in a wireless communication system is provided. The method includes receiving information about a precoding resource block group configuration, receiving at least one of downlink control information or a higher layer signal, and determining sizes of precoding resource block groups applied to a plurality of transmission blocks received from a plurality of transmission and reception points (TRPs) based on the precoding resource block group configuration and at least one of the downlink control information, or the higher layer signal.

The method may further include receiving configuration information about one bandwidth part (BWP), and receiving the plurality of transmission blocks based on configuration information about the one BWP.

The method may further include receiving a plurality of pieces of BWP configuration information, and receiving the plurality of transmission blocks based on each of the plurality of pieces of BWP configuration information, wherein the plurality of transmission blocks are received through a same time-frequency resource.

The receiving of the downlink control information may include receiving scheduling information of the plurality of transmission blocks indicated from the plurality of TRPs through one piece of downlink control information or a plurality of pieces of downlink control information, wherein the plurality of transmission blocks are received through a same time-frequency resource.

The sizes of the precoding resource block groups applied to the plurality of transmission blocks may be the same or partially different, wherein the sizes of the precoding resource block groups correspond to physical resource block bundling sizes of the plurality of transmission blocks.

The receiving of the information about the precoding resource block group configuration may include receiving one piece of configuration information about one precoding resource block group applied to the plurality of transmission blocks or a plurality of pieces of configuration information about a plurality of precoding resource block groups respectively applied to the plurality of transmission blocks.

The information about the precoding resource block group configuration may include information about a size determination method of a precoding resource block group, wherein the size determination method of the precoding resource block group includes at least one of a size explicit determination method or a size implicit determination method, wherein the size explicit determination method includes determining a size of the precoding resource block group based on an explicitly defined size, and the size implicit determination method includes determining the size of the precoding resource block group based on a set certain value or a resource to which at least one transmission block from among the plurality of transmission blocks is scheduled.

The determining of the sizes of the precoding resource block groups may include determining the sizes of the precoding resource block groups by using the size explicit determination method, wherein the size implicit determination method is not supported.

When the plurality of transmission blocks are received from the plurality of TRPs, the plurality of transmission blocks may be scheduled to occupy at least one of a same frequency resource or a same time-frequency resource.

The resource to which at least one transmission block from among the plurality of transmission blocks is scheduled may be an intersection or a union of resources occupied by the plurality of transmission blocks, or a resource to which a certain transmission block is scheduled.

The size implicit determination method may include determining the size of the precoding resource block group by considering at least one of multi-user multiple-input multiple-output (MU-MIMO) transmission information, demodulation reference signal (DMRS) indication information, BWP size information, or physical downlink control channel (PDCCH) resource element group (REG) bundling size information, instead of the scheduling resource.

The determining of the sizes of the precoding resource block groups may include, when the sizes of the precoding resource block groups respectively corresponding to the plurality of transmission blocks are differently indicated, selecting one of the information about the precoding resource block group configuration received through the higher layer signal or the information about the precoding resource block group information received through the downlink control information and determining the sizes of the precoding resource block groups applied to all of the plurality of transmission blocks based on the selected information about the precoding resource block group configuration.

The determining of the sizes of the precoding resource block groups may include determining the sizes of the precoding resource block groups applied to all of the plurality of transmission blocks based on a size of a precoding resource block group applied to one of the plurality of transmission blocks, or selecting one of size determination methods included in the information about the precoding resource block group configuration and determining the sizes of the precoding resource block groups applied to all of the plurality of transmission blocks based on the selected size determination method.

According to another aspect of the disclosure, a terminal for supporting non-coherent joint transmission in a wireless communication system is provided. The terminal includes a transceiver, and at least one processor coupled with the transceiver and configured to receive information about a precoding resource block group configuration, receive at least one of downlink control information or a higher layer signal, and determine sizes of precoding resource block groups applied to a plurality of transmission blocks received from a plurality of TRPs based on the precoding resource block group configuration and at least one of the downlink control information or the higher layer signal.

The at least one processor may be further configured to receive configuration information about one BWP and receive the plurality of transmission blocks based on the configuration information about the one BWP.

The at least one processor may be further configured to receive configuration information about a plurality of BWPs and receive the plurality of transmission blocks based on each of the plurality of BWPs about which configuration information is received, wherein the plurality of transmission blocks are received through a same time-frequency resource.

The at least one processor may be further configured to receive scheduling information of the plurality of transmission blocks indicated from the plurality of TRPs through one piece of downlink control information or a plurality of pieces of downlink control information, wherein the plurality of transmission blocks are received through a same time-frequency resource.

The sizes of the precoding resource block groups applied to the plurality of transmission blocks may be the same or partially different, wherein the sizes of the precoding resource block groups correspond to physical resource block bundling sizes of the plurality of transmission blocks.

The at least one processor may be further configured to receive configuration information about one precoding resource block group applied to the plurality of transmission blocks or receive configuration information about a plurality of precoding resource block groups respectively applied to the plurality of transmission blocks.

The information about the precoding resource block group may include information about a size determination method of a precoding resource block group, wherein the size determination method of the precoding resource block group includes at least one of a size explicit determination method or a size implicit determination method, wherein the size explicit determination method includes determining a size of the precoding resource block group based on an explicitly defined size, and the size implicit determination method includes determining the size of the precoding resource block group based on a set certain value or a resource to which at least one transmission block from among the plurality of transmission blocks is scheduled.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 16 illustrates a DMRS configuration 2 in an NR system, according to an embodiment of the disclosure;

Throughout the drawings, like reference numerals will be understood to refer to like parts, components, and structures.

DETAILED DESCRIPTION

Figure 1:
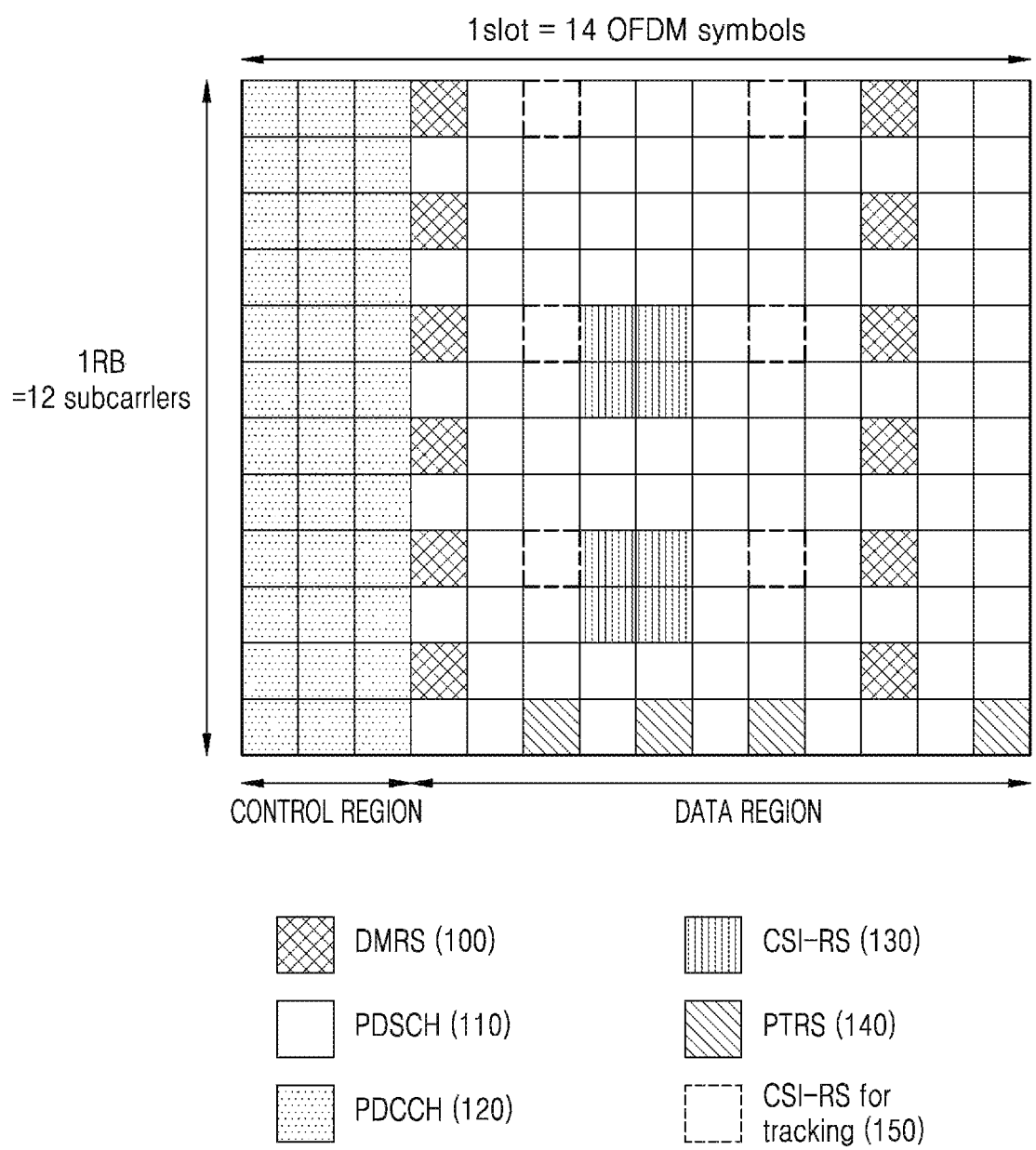
FIG. 1 is a diagram illustrating a wireless resource configuration of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Mobile communication systems have evolved into high-speed, high-quality wireless packet data communication systems that provide data and multimedia services, beyond early voice-oriented services. To this end, various standards organizations such as 3rd Generation Partnership Project (3GPP), 3rd Generation Partnership Project 2 (3GPP2), and Institute of Electrical and Electronics Engineers (IEEE) have been working on the standardization of 3rd generation evolved mobile communication system to which a multiple access scheme using a multi-carrier is applied. Recently, various mobile communication standards such as long term evolution (LTE) of 3GPP, ultra mobile broadband (UMB) of 3GPP2, and 802.16m of IEEE have been developed to support high-speed and high-quality wireless packet data transmission services based on a multiple access scheme using a multi-carrier.

Existing 3G mobile communication systems such as LTE, UMB, and 802.16m are based on a multi-carrier multiple access scheme, apply multiple-input multiple-output (MIMO) to improve transmission efficiency, and use various technologies such as beamforming, an adaptive modulation and coding (AMC) method, and a channel sensitive scheduling method.

The various technologies may enhance transmission efficiency and improve system throughput through a method of concentrating a transmission power that is transmitted from multiple antennas or adjusting the amount of transmitted data based on channel quality or the like, and selectively transmitting data to a user having good channel quality. Most of those schemes are operated based on channel state information of a channel between a base station (which may be interchangeably used with an enhanced node B, an evolved node B (eNB), or a base station (BS)) and a terminal (which may be interchangeably used with a user equipment (UE) or a mobile station (MS)), and thus, the eNB or the UE may need to measure a channel state between the base station and the terminal, and in this instance, a channel state information reference signal (CSI-RS) is used. The eNB indicates a downlink transmission and uplink reception device located in a predetermined place, and in a single mobile communication system, a plurality of eNBs are geographically distributed and each eNB performs transmission/reception in association with a plurality of cells.

Existing 3G and 4G mobile communication systems such as LTE and LTE-A utilize MIMO technology that executes transmission using a plurality of transmission and reception antennas to improve a data rate and system throughput. The MIMO technology utilizes a plurality of transmission and reception antennas in order to spatially separate a plurality of information streams when the information streams are transmitted. Spatially separating and transmitting a plurality of information streams is referred to as spatial multiplexing. Generally, the number of information streams to which spatial multiplexing may be applied may vary according to the number of antennas included in a transmitter and a receiver. Generally, the number of information streams to which spatial multiplexing may be applied is referred to as a rank of corresponding transmission. In MIMO technology supported in the standards up to LTE/LTE-A Release 11, spatial multiplexing of a case where the number of transmission antennas and the number of reception antennas are respectively 16 and 8 is supported, and a rank of up to 8 is supported.

The design purpose of new radio (NR) systems that are 5G mobile communication systems currently under discussion is to support various services such as enhanced mobile broadband (eMBB), massive machine type communications (mMTC), and ultra-reliable and low-latency communications (URLLC), and for the purpose, time and frequency resources may be flexibly used by allowing transmission of reference signals that are always transmitted to be minimized and aperiodically performed.

Hereinafter, embodiments of the disclosure will be described with reference to the attached drawings.

While describing the embodiments of the disclosure, descriptions of techniques that are well known in the art and not directly related to the disclosure are omitted. This is to clearly convey the points of the disclosure by omitting an unnecessary explanation.

For the same reason, some elements in the attached drawings are exaggerated, omitted, or schematically illustrated. Also, a size of each element does not entirely reflect a real size of the element. In the drawings, the same or corresponding elements are denoted by the same reference numerals.

The advantages and features of the disclosure and methods of achieving them will become apparent with reference to embodiments of the disclosure described below along with the attached drawings. The disclosure may, however, be embodied in many different forms and should not be construed as limited to embodiments of the disclosure set forth herein. Rather, these embodiments of the disclosure are provided so that this disclosure will be thorough and complete, and will fully convey the scope of the disclosure to one of ordinary skill in the art. In the specification, the same reference numerals denote the same elements.

It will be understood that each block of flowchart illustrations and combinations of blocks in the flowchart illustrations may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit" used in the present embodiment of the disclosure refers to a software or hardware component, such as field-programmable gate array (FPGA) or application-specific integrated circuit (ASIC), which performs certain tasks. However, the term "~unit" does not mean to be limited to software or hardware. A unit may be configured to be in an addressable storage medium or configured to operate one or more processors. Thus, a unit may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and units may be combined into fewer components and units or further separated into additional components and units. In addition, the components and units may be implemented to operate one or more central processing units (CPUs) in a device or a secure multimedia card.

While describing the disclosure, detailed descriptions about related well known functions or configurations that may blur the points of the disclosure are omitted. The terms used herein are those defined in consideration of functions in the disclosure, but the terms may vary according to the intention of users or operators, precedents, etc. Therefore, the terms used herein have to be defined based on the meaning of the terms together with the description throughout the specification.

Although an embodiment of the disclosure is described by using an NR system, an LTE system, and an LTE-A system, the disclosure may also be applied to other similar communication systems.

The disclosure relates to a communication scheme and system for convergence of 5G communication systems for supporting a higher data rate after 4G systems with IoT technology. The disclosure may be applied to intelligent services (e.g., smart homes, smart buildings, smart cities, smart cars or connected cars, health care, digital education, retail business, and security and safety related services) based on 5G communication technology and IoT related technology. The disclosure provides a method in which a terminal and a base station efficiently support non-coherent joint transmission (NC-JT) in a band below and above 6 GHz.

According to an embodiment of the disclosure, Release 15 (Rel-15) that is Phase-I of NR supports data transmission/reception by basically assuming one transmission point, and in enhanced NR-MIMO of Rel-16 that is Phase-II, a plurality of transmission points are assumed to improve the performance of a system. In this case, the disclosure relates to operations of a terminal and a base station necessary when the base station configures and indicates beam information to the terminal during NC-JT transmission in which a plurality of transmission points transmit each codeword to one terminal. In NR, the base station may transmit each codeword for each transmission and reception point (TRP) to the terminal to ensure higher performance. In this case, existing physical downlink control channel (PDCCH) and physical downlink shared channel (PDSCH) configurations indicated based on a single TRP may be redundant and a mismatch may occur between the configurations. The disclosure provides a method of defining a configuration specialized for NC-JT for addressing such a mismatch and a priority for addressing the mismatch.

The term "reference signal" (RS) used herein refers to a signal that is received from a base station and enables a terminal to estimate a channel, and examples of the reference signal include a common reference signal (CRS) and a demodulation reference signal (DMRS) that is a UE-specific reference signal in an LTE communication system. A CRS that is a reference signal transmitted over an entire downlink band may be received by all terminals, and is used to estimate a channel, configure feedback information of a terminal, and decode control and data channels. A DMRS that is also a reference signal transmitted over an entire downlink band is used to estimate a channel and decode a data channel of a specific terminal, and is not used to configure feedback information, unlike a CRS. Accordingly, a DMRS is transmitted through a physical resource block (PRB) resource to be scheduled by a terminal.

In LTE, channel estimation for data decoding using a DMRS is performed within a precoding resource block group (PRG) that is a bundling unit, by using PRB bundling associated with a system band. In NR that is a 5G system, dynamic indication is supported through radio resource control (RRC) and 1-bit downlink control information (DCI), and in this case, implicit determination is supported to support up to three PRB bundling values that may be indicated through 1-bit DCI. The disclosure provides a method of using a PRB bundling method supported in existing NR when NC-JT is supported.

Also, higher layer signaling (upper layer signaling) used herein such as RRC signaling, packet data convergence protocol (PDCP) signaling, or medium access control element (MAC CE) is a method of transmitting a signal from a base station to a terminal by using a physical layer downlink data channel (e.g., a PDSCH) or from the terminal to the base station by using a physical layer uplink data channel (e.g., a physical uplink shared channel (PUSCH)).

FIG. 1 is a diagram illustrating a wireless resource configuration of a long term evolution (LTE) system according to an embodiment of the disclosure.

Referring to FIG. 1, the radio resource includes one subframe (which may be referred to as a slot) along a time axis and one resource block along a frequency axis. The radio resource includes 12 subcarriers in a frequency domain and 14 orthogonal frequency division multiplexing (OFDM) symbols in a time domain, and thus has a total of 168 unique frequency and time locations. In NR, like in LTE and LTE-A, each unique frequency-time location of FIG. 1 is referred to as a resource element (RE).

The following different types of signals may be transmitted through the radio resource of FIG. 1.

1. DMRS 100: The DMRS is a reference signal transmitted for a specific terminal, and is transmitted only when data is transmitted to the specific terminal. In an LTE-A system, the DMRS may be transmitted through a total of 8 DMRS antenna ports (which may be interchangeably used with ports). In LTE/LTE-A, ports from port 7 to port 14 are DMRS ports and ports maintain orthogonality in order to prevent interference therebetween using code division multiplexing (CDM) or frequency division multiplexing (FDM).

2. PDSCH 110: The PDSCH is a data channel transmitted in a downlink, is used when a base station transmits traffic to a terminal, and is transmitted by using an RE in which a reference signal is not transmitted in a data region of FIG. 1.

3. PDCCH 120: The PDCCH is a control channel transmitted in a downlink and is a channel for indicating various control information such as resource allocation through which a base station schedules a PDSCH or a PUSCH to a terminal, a modulation and coding scheme (MCS), a redundancy version (RV), and a precoding resource block group (PRG).

4. CSI-RS 130: The CSI-RS is a reference signal transmitted for terminals belonging to one cell and is used to measure a channel state. A plurality of CSI-RSs may be transmitted in a single cell. CSI-RSs may be transmitted through predetermined time and frequency resources by using a specific pattern of a specific location in LTE, whereas CSI-RSs may be combined and used at free time and frequency locations by using (2,1), (2,2), or (4,1) unit RE patterns based on a frequency and a time in NR.

5. Phase Tracking Reference Signal, (PTRS) 140: The PTRS is a reference signal for estimating a phase that generally rapidly changes in a high frequency band (e.g., 28 GHz) equal to or higher than 6 GHz and may configure a location offset and a density, and the use of the PTRS may be indirectly dynamically indicated by using an MCS.

6. CSI-RS for tracking 150: When reference signals for time-and-frequency synchronization other than a synchronization signal block (SSB) and physical broadcast channel (PBCH) DMRS are insufficient due to the absence of a cell-specific RS (CRS) supported in LTE, a reference signal for such synchronization may be additionally allocated. As an example, based on a CSI-RS, whether to use the CSI-RS within a CSI-RS set for tracking may be configured by RRC.

In an NR system, in addition to the above signals, a zero power (ZP) CSI-RS for muting may be configured so that a CSI-RS transmitted by another base station is received by terminals of a corresponding cell without interference. A ZP CSI-RS may be applied to a location where a CSI-RS may be transmitted, and a terminal may skip a radio resource and may receive a traffic signal, and transmission power may not be transmitted.

Also, a terminal may be allocated with CSI-interference measurements (CSI-IMs) (or CSI-interference measurement resources (CSI-IMRs)) along with CSI-RSs. The CSI-IM resources may be configured to be (4, 1) or (2, 2) resource through higher layer signaling based on a frequency and a time. The CSI-IM is a resource for measuring interference when a terminal receives a PDSCH. For example, when it is desired to measure the amount of interference when an adjacent base station transmits data and the amount of interference when the adjacent base station does not transmit data, a base station may configure a CSI-RS and two CSI-IM resources, and may effectively measure the amount of interference of the adjacent base station by causing the adjacent base station to always transmit a signal on one CSI-IM and to always not transmit a signal on the other CSI-IM.

In an LTE-A system, a terminal may feed information about a channel state of a downlink back to a base station to use the information for downlink scheduling of the base station. That is, the terminal measures a reference signal transmitted by the base station in the downlink and feeds information extracted from the reference signal back to the base station in a form defined in the LTE and LTE-A standards. In LTE and LTE-A, information fed back by the terminal includes the following three kinds of information.

Rank indicator (RI): The number of spatial layers that may be received by the terminal in a current channel state Precoder matrix indicator (PMI): An indicator of a precoding matrix preferred by the terminal in the current channel state Channel quality indicator (CQI): A maximum data rate at which the terminal may receive data in the current channel state. The CQI may be replaced by a signal to interference plus noise ratio (SINR) that may be used similarly to the maximum data rate, a maximum error correction code rate and modulation method, or data efficiency per frequency.

The RI, PMI and CQI have meanings associated with one another. For example, a precoding matrix supported in LTE and LTE-A is differently defined for each rank. For this reason, although a PMI value when the RI has a value of 1 and a PMI value when the RI has a value of 2 are the same, they are differently interpreted. Furthermore, it is assumed that a rank value and a PMI value which the terminal reported to the base station have been applied to the base station even when the terminal determines a CQI. That is, when a rank is RI_X and a PMI is PMI_Y in the case where the terminal reports RI_X, PMI_Y and CQI_Z to the base station, this indicates that the terminal may receive a data rate corresponding to the CQI_Z. As described above, the terminal assumes which transmission method the base station is to perform when calculating a CQI, and thus, optimized performance may be achieved when transmission is actually performed in the transmission method.

Figure 2:
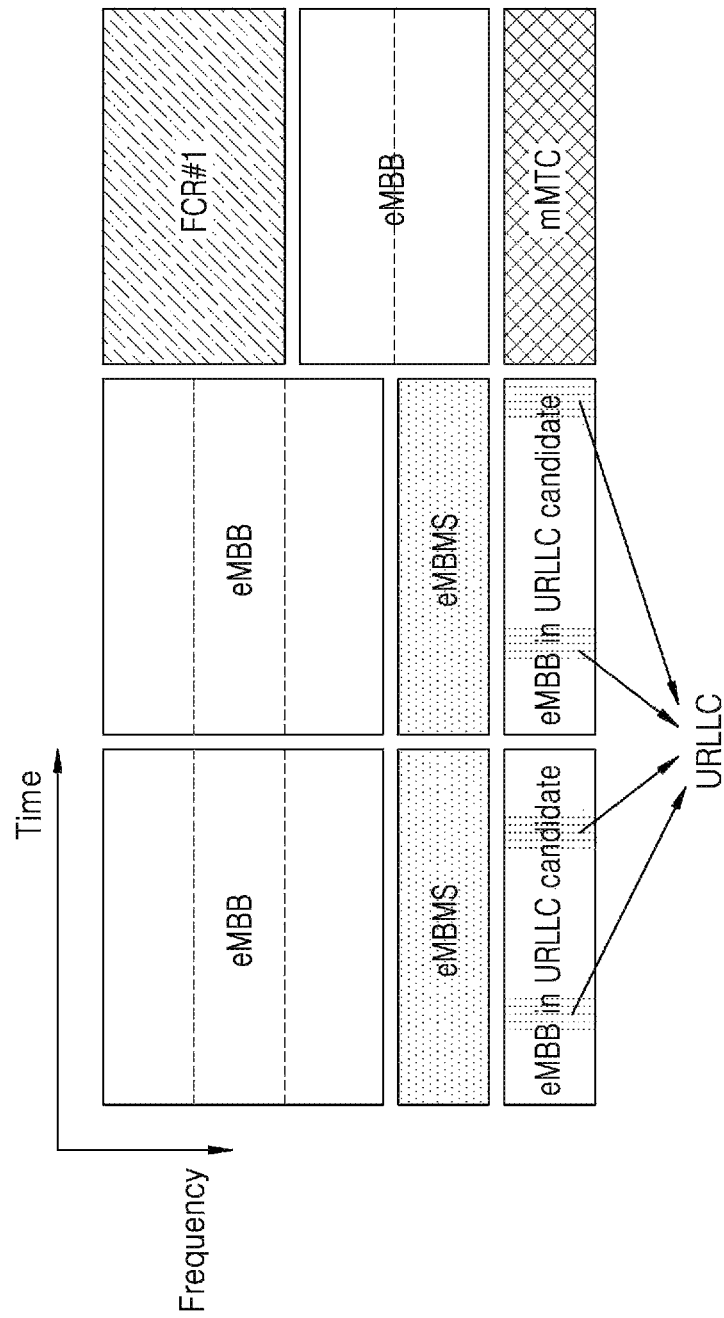
FIG. 2 is a diagram illustrating a wireless resource configuration of data, such as enhanced mobile broadband (eMBB), ultra-reliable and low-latency communications (URLLC), or massive machine type communications (mMTC), in a new radio (NR) system, according to an embodiment of the disclosure.

FIG. 2 is a diagram illustrating a wireless resource configuration of data, such as eMBB, URLLC, or mMTC, in an NR system, according to an embodiment of the disclosure.

Referring to FIG. 2, according to an embodiment of the disclosure, when URLLC data is generated and needs to be transmitted while eMBB data and mMTC data are allocated and transmitted in a specific frequency band, a transmitter may empty parts to which the eMBB data and the mMTC data are pre-allocated and may transmit the URLLC data. Because a short delay time is particularly important for URLLC among the above services, the URLLC data may be allocated to parts of resources to which eMBB is allocated and may be transmitted, and the eMBB resources may be notified to a terminal in advance.

To this end, the eMBB data may be transmitted in a time-frequency resource where the eMBB data and the URLLC data overlap, and thus the transmission performance of the eMBB data may be lowered. In this case, eMBB data transmission failure may occur due to URLLC allocation. A length of a transmission time interval (TTI) used for URLLC transmission may be less than that used for eMBB transmission or mMTC transmission.

In a process of accessing a wireless communication system by the terminal, a synchronization signal is used to acquire synchronization with a cell in a network. More specifically, the synchronization signal refers to a reference signal transmitted for time-and-frequency synchronization and cell search by a base station upon initial access of the terminal, and a signal such as a primary synchronization signal (PSS) or a secondary synchronization signal (SSS) may be transmitted for synchronization in LTE. Also, in order to access the cell after the synchronization with the cell is acquired through a cell search procedure, cell system information has to be obtained, and the following system information may be transmitted through a physical broadcast channel (PBCH) and a PDSCH.

The synchronization signal and the PBCH may be transmitted at certain intervals along a time axis, and may be transmitted within a transmission bandwidth along a frequency axis. In order to indicate a cell number (cell ID) by using the synchronization signal, a special sequence may be mapped to a sub-carrier within the transmission bandwidth, and the cell number may be mapped in a combination of one or more sequences. Accordingly, the terminal may detect the number of the cell to be accessed by the terminal by detecting the sequence used for the synchronization signal.

Figure 3:
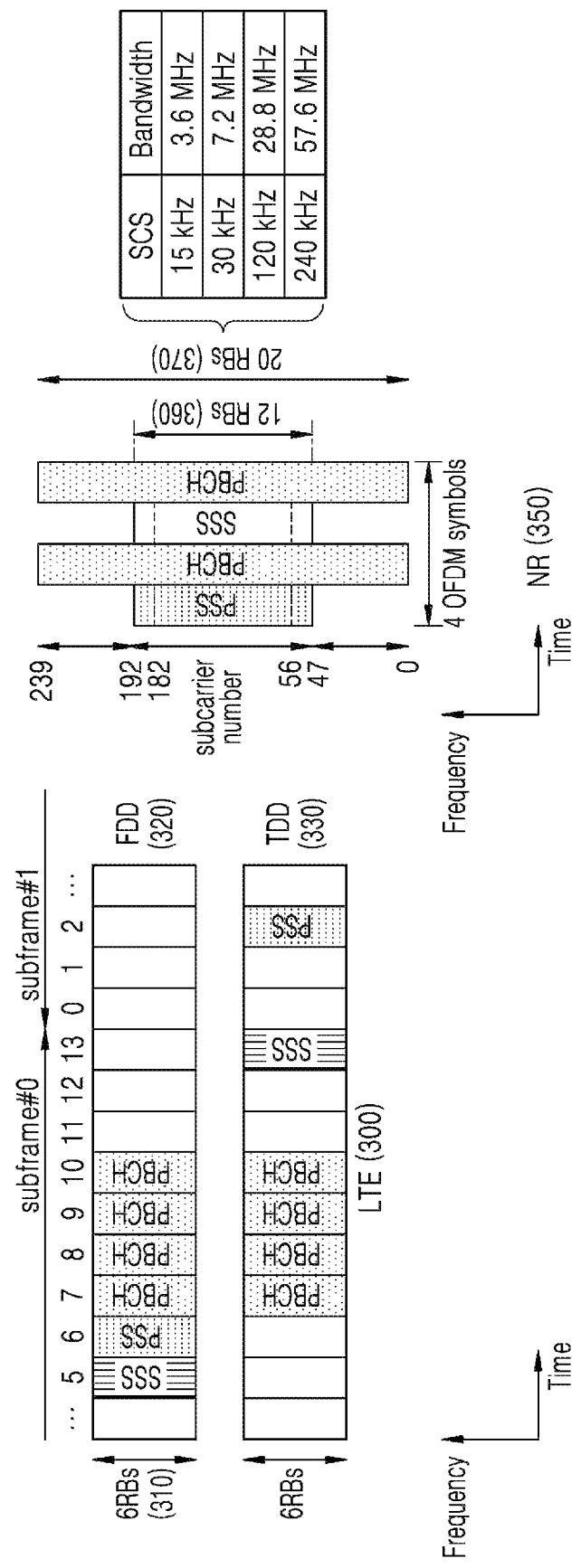
FIG. 3 is a diagram illustrating a synchronization signal and a physical broadcast channel (PBCH) transmitted in LTE and NR, according to an embodiment of the disclosure.

FIG. 3 is a diagram illustrating a synchronization signal and a PBCH transmitted in LTE and NR, according to an embodiment of the disclosure.

Table 1 shows a channel structure of an SS/PBCH block in LTE and NR.

TABLE 1

| LTE | | NR |
|---|---|---|
| Single | # SS/PBCH blocks | Multiple (per band) |
| 6 PRBs | SS/PBCH block bandwidth | 20 PRBs |
| 1 | # Symbol for PSS | 1 |
| 1 | # Symbol for SSS | 1 |
| 4 for SF #0 | # Symbol for PBCH | 2 + 1 multiplexed with SSS |
| 62 + 10 empty | # REs for PSS | 127 + 17 empty |
| 62 + 10 empty | # REs for SSS | 127 + 17 empty |
| 240 | # REs for PBCH | 432 |
| 48 | # REs for RS | 144 (Density: 3 REs/RB/Symbol) |
| Different | TDD vs FDD | Unified |

Referring to FIG. 3, and with reference to Table 1, although a PSS, an SSS, and a PBCH in LTE 300 are transmitted by using the same frequency resources (6 PRBs 310) along a frequency axis, the number of resources occupied by a PSS and an SSS and the number of resources occupied by a PBCH along a frequency axis in NR 350 are respectively 12 PRBs 360 and 20 PRBs 370 which are different from each other. Also, time-division duplexing (TDD) 330 and frequency-division duplexing (FDD) 320 of the LTE 300 have different transmission locations whereas TDD and FDD in the NR 350 have the same transmission location.

Table 2 shows a PSS sequence in LTE and NR.

TABLE 2

| LTE | | NR |
|---|---|---|
| ZC-sequence | Sequence Type | M-sequence |
| 63 | Sequence Length | 127 |
| 3 | # Sequences | 3 |
| 3 root indices of ZC-sequences | How to Represent Cell ID Info | 3 cyclic shifts of single M-sequence |
| No modulation | Modulation | BPSK |
| DC subcarrier is truncated (62 REs) | Mapping to REs | DC subcarrier is not truncated (127 REs) |

As shown in Table 2, while a PSS in LTE uses a Zadoff-Chu sequence that has constant amplitude zero auto correlation (CAZAC) characteristics, a PSS in NR uses an M-sequence that is a pseudo random sequence. LTE and NR are the same in that three sequences are supported.

Table 3 shows an SSS sequence in LTE and NR.

TABLE 3

| LTE | | NR |
|---|---|---|
| M-sequence | Sequence Type | Gold-sequence (XOR of 2 M-sequences) |
| 31 | Sequence Length | 127 |
| Cell ID and half radio frame timing (504*2) | Carried Info (# Sequences) | Cell ID only (1008) |
| interleaved two M-sequences, where each M-sequence carries part of the cell ID info, and a further scrambling carries the half radio frame timing | Construction Method | each of the M-sequences carries part of the cell ID info |

TABLE 3-continued

| LTE | | NR |
|---|---|---|
| BPSK | Modulation | BPSK |
| DC subcarrier is truncated (62 REs) | Mapping to REs | DC subcarrier is not truncated (127 REs) |

As shown in Table 3, while an M-sequence having a sequence length of 31 is used in LTE, an SSS is supported through a gold sequence having a sequence length of 127 in NR. In LTE, as described above, a PSS is generated by using three Zadoff-Chu sequences, and an SSS is generated by using an M-sequence. In this case, a PSS of one cell may have three different values according to physical layer cell IDs of the cell, and three cell IDs in one cell ID group correspond to different PSSs. Accordingly, a terminal may recognize one cell ID group from among three cell ID groups supported in LTE by detecting the PSS of the cell. The terminal finally identifies a cell ID to which the cell belongs by additionally detecting an SSS from among 168 cell IDs reduced from 504 cell IDs through the cell ID group recognized by using the PSS.

In NR, a terminal recognizes three cell ID groups through an M-sequence-based PSS, and detects 1008 cell IDs by detecting 336 cell ID groups by using a gold sequence-based SSS to finally detect one cell ID from among the 1008 cell IDs.

PBCH transmission in NR is different from PBCH transmission in LTE in terms of channel coding, a reference signal, etc. Table 4 shows a difference of PBCH transmission in LTE and NR.

TABLE 4

| LTE | | NR |
|---|---|---|
| Tail-Biting Convolutional Code (TBCC) | Channel coding | Polar codes, same as PDCCH |
| QPSK | Modulation | QPSK |
| Frequency-first, time-second | Resource mapping | Frequency-first, time-second |
| 1/2/4 ports (UE blind detection with CRC mask) | Transmission scheme | 1 port, and same as SSS |
| 40 ms | TTI | 80 ms |

As shown in Table 4, while a PBCH in LTE is transmitted every 40 ms based on a tail-biting convolutional code (TBCC), a PBCH in NR is transmitted every 80 ms by using a polar code. In this case, while channel estimation in LTE is performed on a PBCH by using a CRS, a channel for decoding a PBCH is estimated by using a PBCH DMRS in NR.

In NR, a PSS, an SSS, and a PBCH are collectively referred to as an Synchronization Signal (SS) block (which may be interchangeably used with an SSB, an SS/PBCH, or an SS/PBCH block). In an NR system, an SS and a PBCH are allowed to be transmitted through different beams by allowing a plurality of SS blocks to be transmitted.

Figure 4:
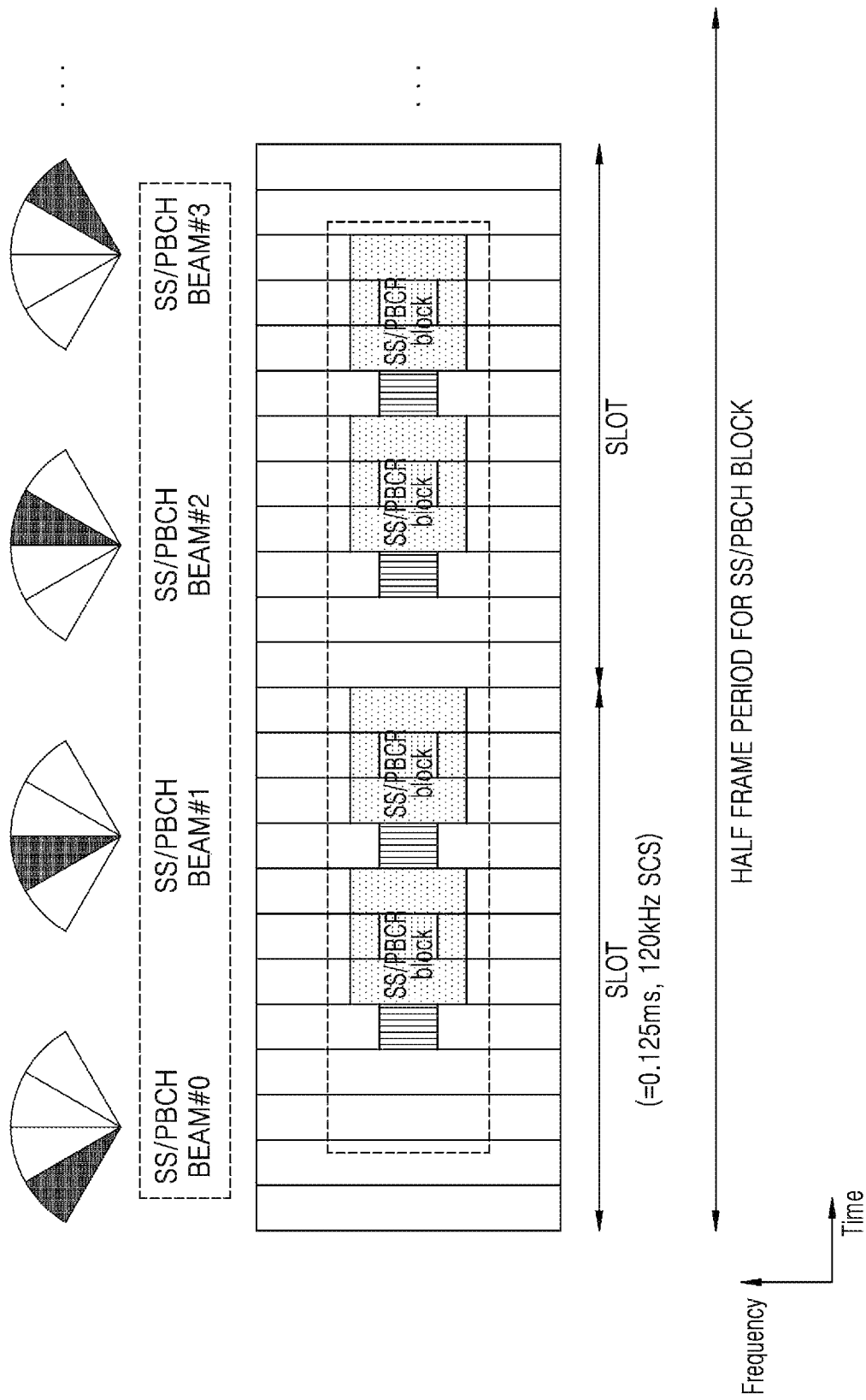
FIG. 4 is a diagram illustrating an example where a plurality of synchronization signal (SS) blocks are transmitted by using different beams, according to an embodiment of the disclosure.

FIG. 4 is a diagram illustrating an example where a plurality of SS blocks are transmitted by using different beams, according to an embodiment of the disclosure.

Referring to FIG. 4, in NR, an SS block includes a PSS, an SSS, and a PBCH, and a plurality of SS blocks may be transmitted to a terminal. The SS blocks may be transmitted to the terminal by using different beams. For example, the SS blocks illustrated in FIG. 4 are respectively transmitted by using beams #0, #1, #2, and #3.

Information transmitted through the PBCH in the SS block is changed differently from LTE. Table 5 shows master information block (MIB) information transmitted through the PBCH in LTE and NR.

TABLE 5

| LTE | NR | |
|---|---|---|
| 3 bits | Channel bandwidth | |
| 3 bits | PHICH configuration | |
| 8 LSBs of SFN | System Frame Number (SFN) | 10 bits of SFN |
| | MSB of SS/PBCH block index | 3 bits (>6 GHz) |
| | Half frame timing | 1 bit |
| | Subcarrier spacing for common control | 1 bit |
| | SS/PBCH subcarrier offset | 4 bits + 1 bit (<6 GHz) |
| | DMRS Type A position for PDSCH | 1 bit |
| | SIB1 PDCCH configuration | 8 bits |
| | Cell barring info | 2 bits + 1 bit reserved |
| 10 bits | Spare | 1 bit (>6 GHz), 2 bits (<6 GHz) |
| 16 bits | CRC | 24 bits |
| 40 bits | Total payload size | 56 bits |

In order to transmit the above-described information, a base station encodes an MIB and transmits the MIB through the PBCH.

Referring to Table 5, in the PBCH of NR, information related to a channel bandwidth and a physical hybrid automatic repeat request indicator channel (PHICH) configuration supported in LTE disappears whereas various information such as a most significant bit (MSB) of an SS/PBCH block index, a half frame timing, a subcarrier spacing for common control channel, and an SS/PBCH subcarrier offset are added. For example, the MSB of the SS/PBCH block index provides MSB information of an SS block index for supporting a plurality of SS blocks, thereby allowing the plurality of SS blocks to be transmitted. The terminal may perform a random access procedure necessary for initial access by transmitting a beam-based physical random access channel (PRACH) to the base station by using a PRACH resource allocated per SS block by securing the SS block index.

Figure 5:
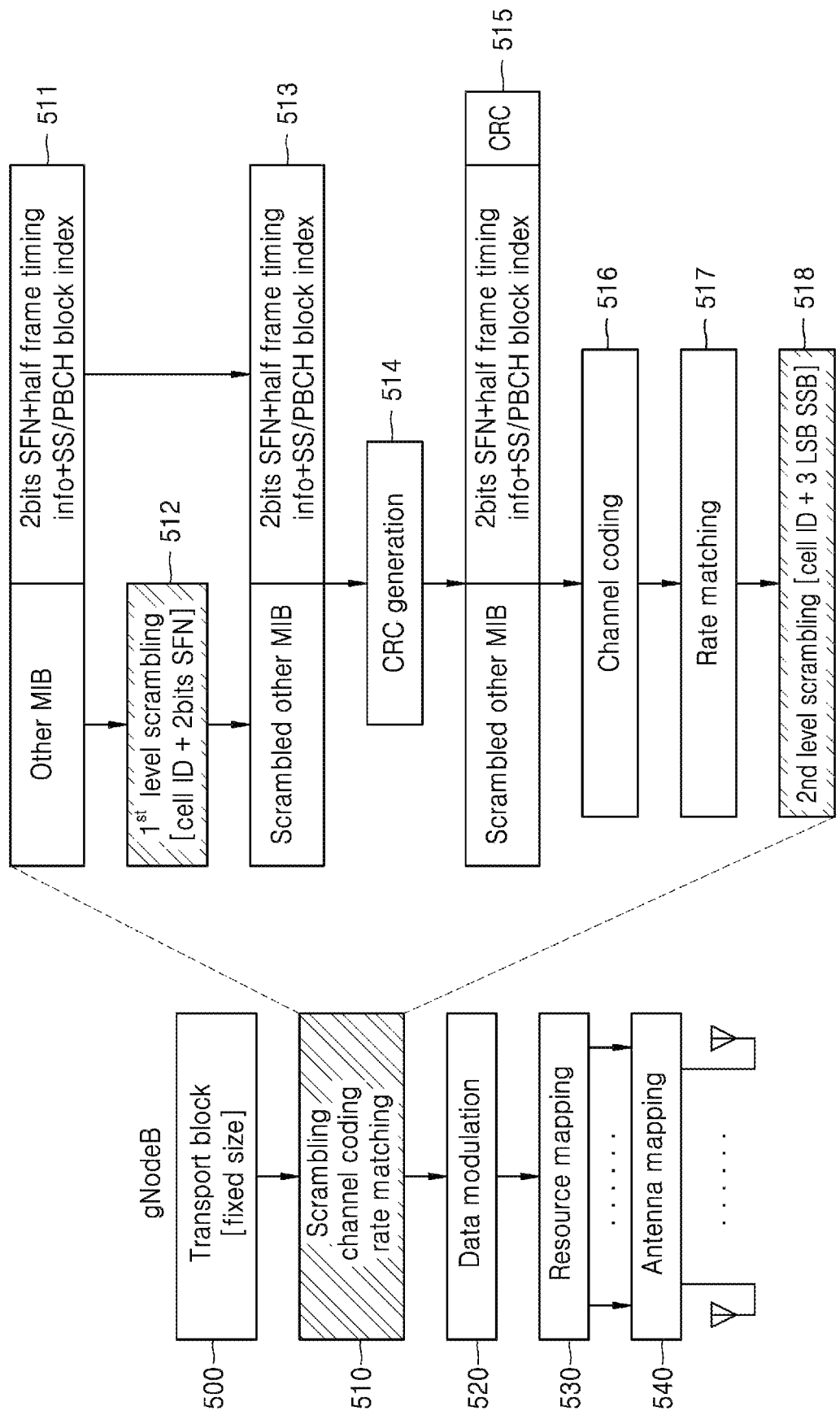
FIG. 5 is a diagram illustrating a procedure in which a base station encodes a master information block (MIB) to transmit the MIB to a PBCH, according to an embodiment of the disclosure.

FIG. 5 is a diagram illustrating a procedure in which a base station encodes an MIB to transmit the MIB to a PBCH, according to an embodiment of the disclosure.

Referring to FIG. 5, in operation 510, a gNode B performs scrambling, channel coding, and rate matching based on a transport block 500 having a fixed size. As an example, in operation 511, a 2-bit system frame number (SFN), half frame timing information, and SS block index information are added to MIB information. The MIB information is scrambled based on the 2-bit SFN and a cell ID in operation 512, and scrambled MIB information, and a 2-bit SFN, half frame timing information, and SS block index information are generated in operation 513. A 24-bit cyclic redundancy check (CRC) is generated based on the scrambled MIB information, and the 2-bit SFN, the half frame timing information, and the SS block index information in operation 514, and scrambled MIB information, and a 2-bit SFN, half frame timing information, and SS block index information are added in operation 515. The scrambled MIB information, and the 2-bit SFN, the half frame timing information, and the SS block index information are channel-coded in operation 516, are rate matched in operation 517, and are scrambled again based on a least significant bit (LSB) of 3 bits of an SSB index and a cell ID in operation 518. The scrambled information is demodulated in operation 520, is mapped to a resource in operation 530, and is mapped to an antenna to be transmitted in operation 540.

Figure 6:
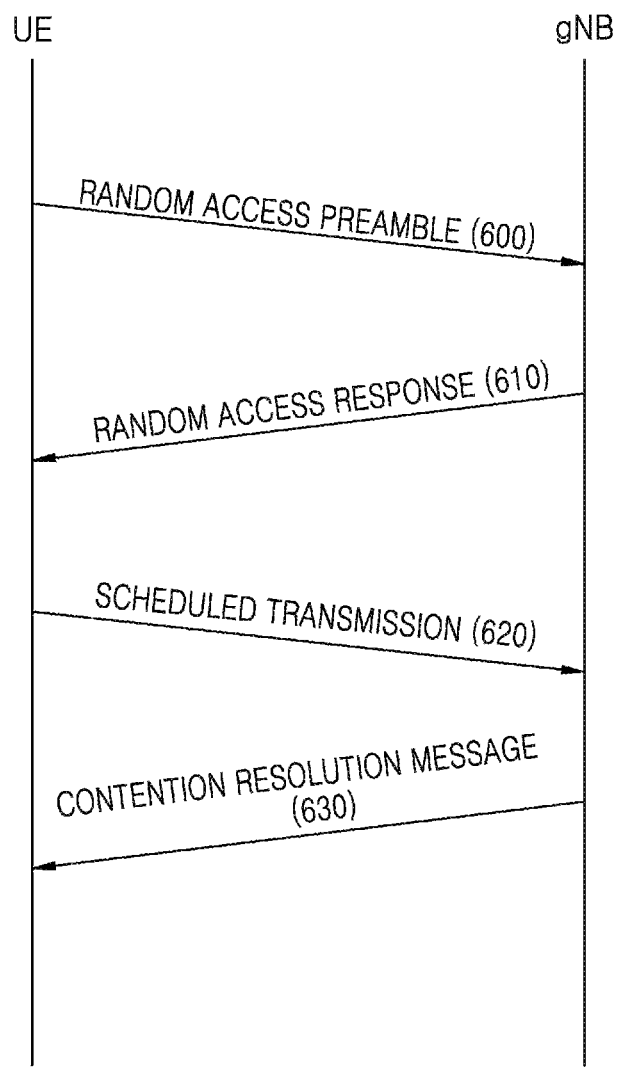
FIG. 6 is a diagram illustrating a random access procedure of a terminal in NR, according to an embodiment of the disclosure.

FIG. 6 is a diagram illustrating a random access procedure of a terminal in NR, according to an embodiment of the disclosure.

Referring to FIG. 6, the terminal may detect a synchronization signal in an SS block and may decode a PBCH. In operation 600, the terminal may transmit a random access preamble, which may be interchangeably used with Msg1, through a PRACH according to a preamble format and time and frequency resources checked based on a decoding result. In operation 610, a base station receives the Msg1, transmits a PDCCH for transmitting a Msg2, which may be interchangeably used with a random access response (RAR), to the terminal, and transmits the Msg2 through a PDSCH to a resource allocated through the PDCCH. In operation 620, the terminal transmits a Msg3, which may be interchangeably used with a scheduled transmission, to the base station and notifies the base station that the Msg2 is successfully received, and in operation 630, the base station transmits a contention resolution message through the PDSCH to notify that contention is resolved.

NR may support a more flexible channel state reporting setting than LTE through a resource setting, a channel measurement setting, and a channel state reporting setting which are necessary to support channel state information reporting.

Figure 7:
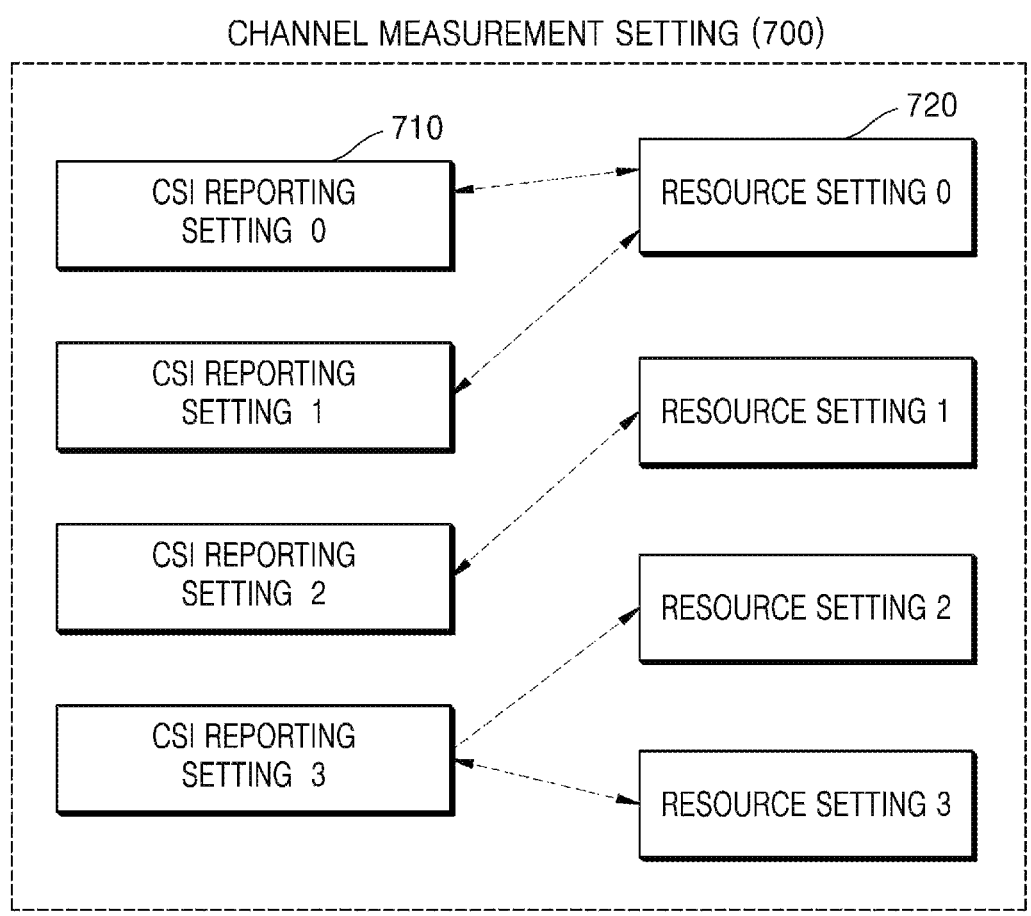
FIG. 7 is a diagram illustrating an example where a base station and a terminal allow a flexible configuration through a reference signal setting, a channel state information (CSI) reporting setting, or a CSI measurement setting and perform a channel state reporting setting based on the flexible setting in NR, according to an embodiment of the disclosure.

FIG. 7 is a diagram illustrating an example where a base station and a terminal allow a flexible configuration through a reference signal setting, a channel state information (CSI) reporting setting, or a CSI measurement setting and perform a channel state reporting setting based on the flexible setting in NR, according to an embodiment of the disclosure.

Referring to FIG. 7, the resource setting, the channel measurement setting, and the channel state reporting setting may include configuration information as follows.

Channel state reporting setting 710: Turning on/off of reporting parameters (e.g., an RI, a PMI, and a CQI) required for channel state reporting may be configured. Also, a channel state reporting type may be configured (e.g., configuration may be performed according to Type I (channel state reporting having a low resolution and an implicit report type) or Type II (channel state reporting having a high resolution, and a type of explicitly reporting an eigenvector, a covariance matrix, etc., by using linear combination-type channel state reporting). For example, a channel state reporting setting (whether to report an RI, a PMI, a CQI, a beam indicator (BI), a CSI-RS resource indicator (CRI), or the like (an individual configuration or a combined configuration)), a reporting method (periodic, aperiodic, and semi-persistent reporting are available, in which the aperiodic and semi-persistent reporting may be configured as one parameter), codebook configuration information, a PMI type (full-band or partial-band), a channel state reporting type (implicit/explicit or Type I/Type II), a channel quality report type (CQI/RSRP), and a resource setting for channel state reporting may be supported.

Resource setting 720: Resource setting corresponds to a configuration including configuration information about a reference signal required for channel state measurement. A CSI-RS resource for channel and interference measurement and an CSI-IM resource for interference measurement may be configured via resource setting, and a plurality of resource settings may exist for this purpose. In addition, a transmission type of a corresponding reference signal (periodic, aperiodic, or semi-persistent transmission), a transmission period and offset of the reference signal, and the like may be configured.

Channel measurement setting 700: Channel measurement setting corresponds to a configuration of mapping or connection between the channel state reporting setting and the resource setting. For example, when there are N channel state reporting settings and M resource settings, L links establishing mapping between these multiple channel state reporting settings and the resource settings may be included in the channel measurement setting. Also, an association setting of a reporting time and a reference signal setting may also be configured.

In addition to periodic and aperiodic channel state reporting supported by LTE, NR supports semi-persistent reference signal transmission and channel state information. Table 6 shows parameters configured in a channel state reporting setting.

in reportFreqConfiguration, and cqi-FormatIndicator may indicate a setting about which type from among a wideband CQI and a subband CQI is to be reported and pmi-FormatIndicator may indicate a configuration about which type from among a wideband PMI and a subband PMI is to be reported.

While reporting modes are supported for periodic and aperiodic reporting modes in LTE, whether a PMI is a wideband PMI or a subband PMI and whether a CQI is a wideband CQI or a subband CQI are configured in a channel state reporting setting in NR as shown in Table 6. In addition, csi-ReportingBand is a setting about which subband from among all subbands is to be reported.

In NR, because semi-persistent channel state reporting supports dynamic activity and inactivity compared to periodic channel state reporting, relatively high terminal complexity is required, but physical uplink control channel

TABLE 6

| Parameter name | Description | Vaule range |
| --- | --- | --- |
| CSI-ReportConfigId | Report config ID | |
| ServCellIndex | Report serving cell ID | |
| resourcesForChannelMeasurement | NZP CSI-RS resource config ID for channel measurement | |
| csi-IM-ResourcesForInterference | CSI-IM resource config ID for interference measurement | |
| nzp-CSI-RS-ResourcesForInterference | NZP CSI-RS resource config ID for interference measurement | |
| reportConfigType | Transmission type of CSI reporting | periodic, semiPersistentOnPUCCH, semiPersistentOnPUSCH, aperiodic |
| reportQuantity | CSI parameters to be reported | none, cri-RI-PMI-CQI, cri-RI-i1, cri-RI-i1-CQI, cri-RI-CQI, cri-RSRP, ssb-Index-RSRP, cri-RI-LI-PMI-CQI |
| reportFreqConfiguration | Reporting configuration on frequency domain | |
| cqi-FormatIndicator | CQI format | wideband CQI, subband CQI |
| pmi-FormatIndicator | PMI format | wideband PMI, subband PMI |
| csi-ReportingBand | CSI reporting band configuration | |

In Table 6, CSI-ReportConfigId is for configuring an ID of a channel state reporting setting, and ServCellIndex refers to an ID of a cell for channel state reporting. resourcesForChannelMeasurement is a non-zero power (NZP) CSI-RS configuration for measuring a signal channel used for channel state reporting, and csi-IM-ResourcesForInterference is a CSI-IM configuration for interference measurement. Also, nzp-CSI-RS-ResourcesForInterference is an NZP CSI-RS configuration for measuring an interference channel used for channel state reporting. reportConfigType is a field for a transmission type setting of channel state reporting, and reportQuantity is a field for configuring channel state reporting parameters, e.g., a CRI, an RI, a PMI, and a CQI used in channel state reporting. Frequency-related parameters used in channel state reporting may be included (PUCCH) and PUSCH resources required for channel state reporting may be efficiently used by using dynamic active and inactive operations.

Also, periodic channel state information of NR may not support subband reporting (a subband CQI or a subband PMI). A PUCCH used in periodic channel state reporting has a limited number of reports that may be transmitted. Therefore, in LTE, a terminal may be allowed to select some subbands in consideration of the limited number of reports that may be transmitted and report channel state information. However, because a report on such selective subbands contains very limited information, the usefulness of this information may be minimal. Therefore, in NR, the lack of support for subband reporting may result in reduced complexity of the terminal and increased efficiency of the reporting.

As mentioned above, NR supports two types of channel state reporting having a low spatial resolution and a high spatial resolution. Tables 7-10 show two types of channel state reporting and a reporting overhead required for each report type. As an example, Table 7 shows Type 1 channel state reporting.

TABLE 7

For two antenna ports, NR supports the following Type 1 codebook.

$$W \in \left\{ \frac{1}{\sqrt{2}} \begin{bmatrix} 1 \\ e^{j\frac{\pi n}{2}} \end{bmatrix}, n = 0, 1, 2, 3 \right\} \text{for rank-1 and } \left\{ \frac{1}{2} [j_n^1 \ -j_n^1], n = 0, 1 \right\} \text{for rank-2}$$

For four or more antenna ports, NR supports the following channel state reporting for ranks 1 through 8.

(1) A PMI codebook assumes a $W = W_1 W_2$ precoder structure, where $$W_1 = \begin{bmatrix} B & 0 \\ 0 & B \end{bmatrix}$$

and B includes L oversampled 2D DFT beams. For ranks 1 and 2, the value of L may be chosen from among 1 and 4, and W2 performs beam selection (only when L = 4) and indicates QPSK co-phasing between two polarizations.
(2) The following 1D/2D antenna port layouts ($N_1$, $N_2$) and oversampling factors ($O_1$, $O_2$) are supported.

| Number of CSI-RS ports | ($N_1$ $N_2$) | ($O_1$, $O_2$) |
|---|---|---|
| 4 | (2,1) | (4, ~) |
| 8 | (2,2) | (4,4) |
|  | (4,1) | (4, ~) |
| 12 | (3,2) | (4,4) |
|  | (6,1) | (4, ~) |
| 16 | (4,2) | (4,4) |
|  | (8,1) | (4, ~) |
| 24 | (6,2) | (4,4) |
|  | (4,3) |  |
|  | (12,1) | (4, ~) |
| 32 | (8,2), (4,4) | (4,4) |
|  | (16,1) | (4, ~) |

TABLE 7-continued (3) For L = 4, the following beam group (B) pattern is supported according to the value of $N_2$.
2D antenna port layout ($N_2 > 1$):
See FIG. 25
1D antenna port layout ($N_2 = 1$):
See FIG. 25

Table 8 is a table showing Type 2 channel state reporting.

TABLE 8

NR supports Type 2 channel state reporting for ranks 1 and 2.
(1) PMI is used for spatial channel information feedback.
(2) PMI codebook assumes the following precoder structure for ranks 1 and 2.

For rank 1: $W = \begin{bmatrix} \tilde{w}_{0,0} \\ \tilde{w}_{1,0} \end{bmatrix} = W_1 W_2$, W is normalized to 1

For rank 2: $W = \begin{bmatrix} \tilde{w}_{0,0} & \tilde{w}_{0,1} \\ \tilde{w}_{1,0} & \tilde{w}_{1,1} \end{bmatrix} = W_1 W_2$, columns of W are normalized to $\frac{1}{\sqrt{2}}$ (3) $\tilde{w}_{r,l} = \sum_{i=0}^{L-1} b_{k_1^{(i)} k_2^{(i)}} \cdot p_{r,l,i}^{(WB)} \cdot p_{r,l,i}^{(SB)} \cdot c_{r,l,i}$ (a weighted combination of L beams)

The value of L may be chosen from among 2, 3, and 4, $b_{k_1,k_2}$ is an oversampled 2D DFT beam, r=0, 1 denotes a polarization, and l=0, 1 denotes a layer. $p_{r,l,i}^{(WB)}$ is a wideband (WB) beam amplitude scaling factor for beam i and on polarization r and layer l.
$p_{r,l,i}^{(SB)}$ is a subband (SB) beam amplitude scaling factor for beam i and on polarization r and layer l.
$c_{r,l,i}$ is a beam phase combining coefficient for beam i and on polarization r and layer l and is configurable between QPSK (2 bits) and 8PSK (3 bits).
An amplitude scaling mode is configurable by a combination of WB and SB (with unequal bit allocation) or by WB only.

Table 9 shows a reporting overhead for Type 1 channel state reporting.

TABLE 9

| Number of CSI-RS ports | ($N_1$, $N_2$) | ($O_1$, $O_2$) | i1 Payload (L = 1) | i1 Payload (L = 4) | i2 payload |
|---|---|---|---|---|---|
| 4 | (2, 1) | (4, —) | 3 bits | 2 bits | For rank1, |
| 8 | (2, 2) | (4, 4) | 6 bits | 4 bits | 2 bits for L = 1, |
|  | (4, 1) | (4, —) | 4 bits | 3 bits | 4 bits for L = 4 |
| 12 | (3, 2) | (4, 4) | 7 bits | 5 bits | For rank2, |
|  | (6, 1) | (4, —) | 4 bits | 3 bits | Additional 2 |
| 16 | (4, 2) | (4, 4) | 7 bits | 5 bits | bits |
|  | (8, 1) | (4, —) | 5 bits | 4 bits | for i1, |
| 24 | (6, 2), (4, 3) | (4, 4) | 8 bits | 6 bits | 1 bits for L = 1, |
|  | (12, 1) | (4, —) | 6 bits | 5 bits | 3 bits for L = 4 |
| 32 | (8, 2), (4, 4) | (4, 4) | 8 bits | 6 bits |  |
|  | (16, 1) | (4, —) | 6 bits | 5 bits |  |

Table 10 shows a reporting overhead for Type 2 channel state reporting. Table 10 describes an example where for a combination of amplitudes of a wideband (WB) and a subband (SB), (N1, N2)=(4,4), Z=3 (8PSK), and K leading coefficients=4, 4, and 6 for L=2, 3, and 4, respectively.

TABLE 10

| L (*) | Rotation: [$\log_2$ ($O_1 O_2$)] | L-beam selection (**) | Strongest coefficient (1 out of 2L): [$\log_2$ 2L] per layer | WB amp: $3 \times (2L - 1)$ per layer | Total WB payload | SB amp (1 SB): $1 \times (K - 1)$ per layer | SBphase (1 SB): $Z \times (K - 1) + 2 \times (2L - K)$ per layer | Total payload (WB + 10 SBs) |
|---|---|---|---|---|---|---|---|---|
| Rank 1 payload (bits) | | | | | | | | |
| 2 | 4 | [7 or 8]   | 2 | 9  | 22 | 3  | 9  | 142 |
| 3 | 4 | [10 or 12] | 3 | 15 | 32 | 3  | 13 | 192 |
| 4 | 4 | [11 or 16] | 3 | 21 | 39 | 5  | 19 | 279 |
| Rank 2 payload (bits) | | | | | | | | |
| 2 | 4 | [7 or 8]   | 4 | 18 | 33 | 6  | 18 | 273 |
| 3 | 4 | [10 or 12] | 6 | 30 | 50 | 6  | 26 | 370 |
| 4 | 4 | [11 or 16] | 6 | 42 | 63 | 10 | 38 | 543 |

Type 1 channel state reporting may report a channel state to a base station through an RI, a PMI, a CQI, and a CRI based on a codebook, as in existing LTE. In contrast, Type 2 reporting provides a higher form of resolution through a greater PMI reporting overhead in addition to an implicit CSI similar to Type 1 reporting, and the PMI reporting is created through a linear combination of multiplying each of up to four orthogonal beams by a phase and an amplitude and adding results. The terminal may report an eigenvector of an explicit channel measured by the terminal by using the PMI reporting.

Also, according to an embodiment of the disclosure, because Type 2 channel state reporting requires a high reporting overhead as described above, the Type 2 channel state reporting may not be suitable for periodic channel state reporting where the number of reportable bits is not large. In contrast, because aperiodic channel state reporting is supported through a PUSCH that may support an overhead having a large number of reports, the Type 2 channel state reporting requiring an overhead having a large number of reports may be supported only for aperiodic channel state reporting. The disclosure is not limited to the above example.

In addition, semi-persistent channel state reporting may support Type 2 CSI. Because the number of channel state reports that may be supported in a short PUCCH is small, Type 2 CSI may be transmitted by using a long PUCCH and only a wideband component of the CSI may be reported in consideration of characteristics of the PUCCH.

Also, in NR, periodic channel state reporting is performed by using an offset and a period configured through higher layer signaling, semi-persistent channel state reporting is performed by using an offset and a period configured through higher layer signaling for a PUCCH, and PUSCH-based semi-persistent channel state reporting is performed a specific point of a time after the terminal receives an activation message by using DCI.

Aperiodic channel state reporting is triggered based on a channel state reporting setting in a channel measurement setting.

Figure 8:
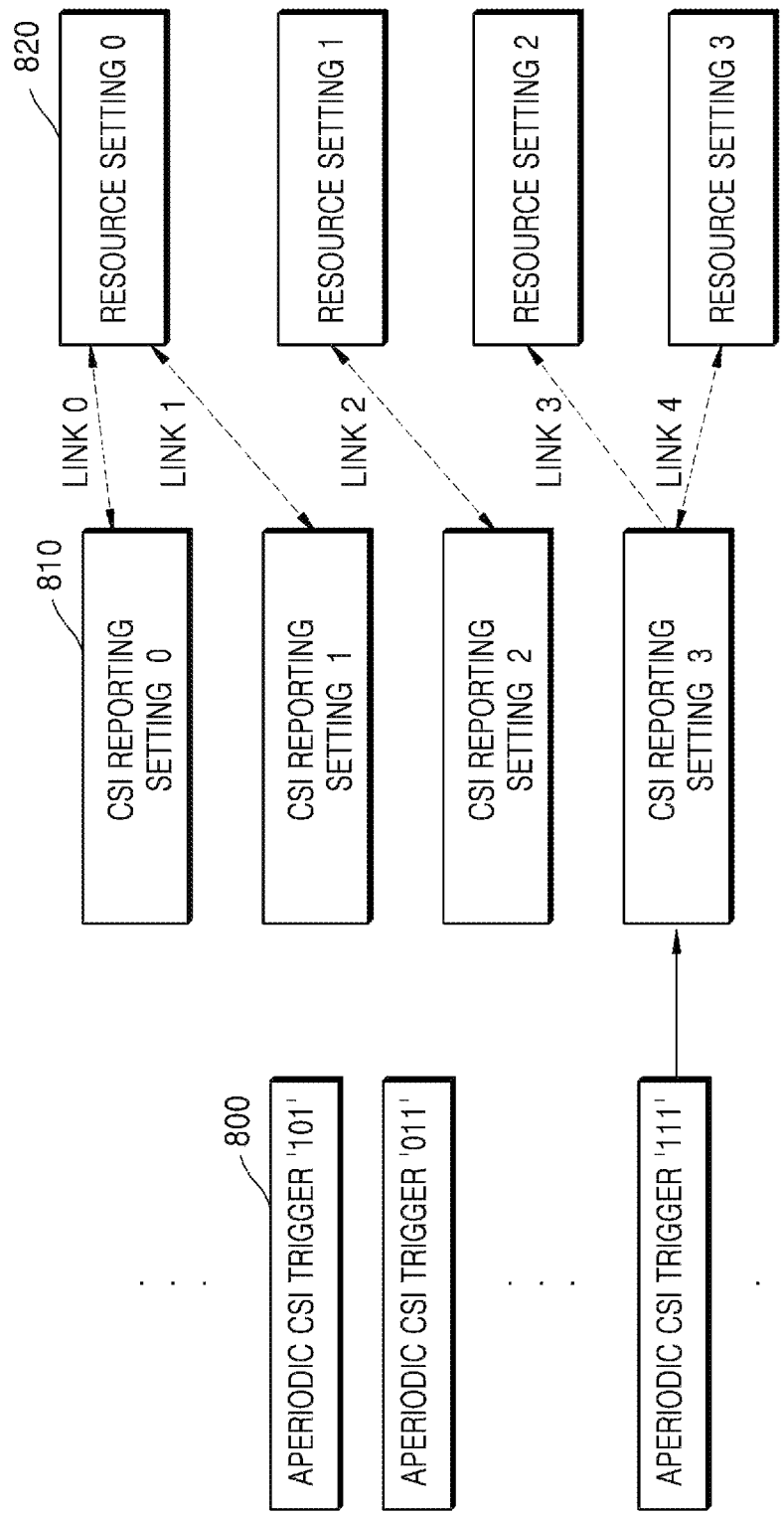
FIG. 8 is a diagram illustrating a method of performing aperiodic channel state reporting by triggering a channel state reporting setting in a trigger configuration, according to an embodiment of the disclosure.

FIG. 8 is a diagram illustrating a method of performing aperiodic channel state reporting by triggering a channel state reporting setting in a trigger configuration, according to an embodiment of the disclosure.

Referring to FIG. 8, a base station may configure a channel state reporting setting 810 triggered for each trigger field 800 to RRC in advance for aperiodic channel state reporting. In this case, the base station may directly configure a channel state reporting setting ID to a trigger configuration to configure the triggered channel state reporting setting. Table 11 shows RRC information indicating such a channel state reporting setting for aperiodic channel state reporting trigger.

TABLE 11

```
-- ASN1START
-- TAG-CSI-APERIODICTRIGGERSTATELIST-START
CSI-AperiodicTriggerStateList ::=         SEQUENCE (SIZE (1..maxNrOfCSI-
AperiodicTriggers)) OF CSI-AperiodicTriggerState
CSI-AperiodicTriggerState ::=             SEQUENCE {
        associatedReportConfigInfoList            SEQUENCE
(SIZE(1..maxNrofReportConfigPerAperiodicTrigger)) OF CSI-
AssociatedReportConfigInfo,
        ...
}
CSI-AssociatedReportConfigInfo ::=        SEQUENCE {
    reportConfigId                        CSI-ReportConfigId,
    resourcesForChannel                   CHOICE {
        nzp-CSI-RS                        SEQUENCE {
            resourceSet                           INTEGER (1..maxNrofNZP-CSI-RS-
ResourceSetsPerConfig),
            qcl-inf                           SEQUENCE (SIZE(1..maxNrofAP-CSI-
RS-ResourcesPerSet)) OF TCI-StateId
```

TABLE 11-continued

```
    },
        csi-SSB-ResourceSet          INTEGER (1..maxNrofCSI-SSB-
ResourceSetsPerConfig)
    },
        csi-IM-ResourcesforInterference    INTEGER(1..maxNrofCSI-IM-
ResourceSetsPerConfig)  OPTIONAL, -- Cond CSI-IM-forInterference
        nzp-CSI-RS-ResourcesforInterference INTEGER (1..maxNrofNZP-CSI-RS-
ResourceSetsPerConfig) OPTIONAL, -- Cond NZP-CSI-RS-forInterference
    ...
}
-- TAG-CSI-APERIODICTRIGGERSTATELIST-STOP
-- ASN1STOP
```

The base station may indirectly indicate an aperiodic CSI-RS 820 for channel measurement and interference measurement by using aperiodic channel state reporting triggering.

Figure 9A:
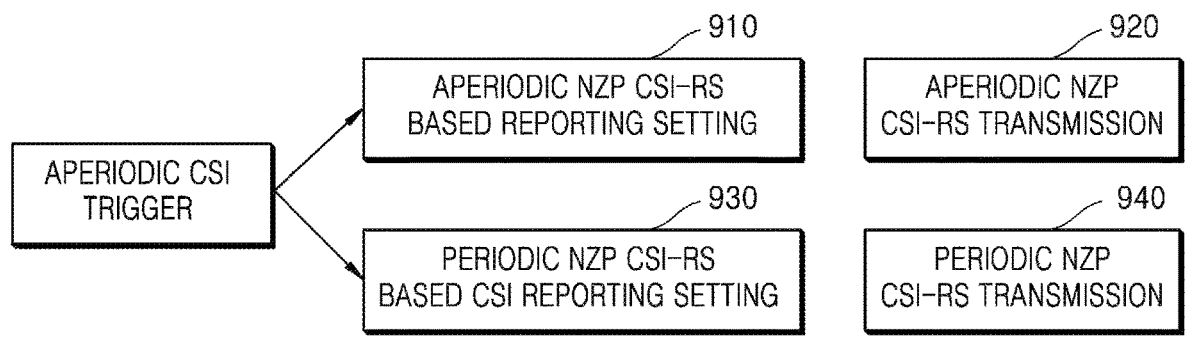
FIG. 9A is a diagram illustrating an example where an aperiodic CSI-reference signal (RS) is indirectly indicated by using an aperiodic channel state reporting indication field, according to an embodiment of the disclosure.

FIG. 9A is a diagram illustrating an example where an aperiodic CSI-RS is indirectly indicated by using an aperiodic channel state reporting indication field, according to an embodiment of the disclosure.

Referring to FIG. 9A, a base station triggers a CSI-RS based on channel state reporting settings 910 and 930. In this case, when a resource supported for channel and interference measurement in a resource setting connected to a predetermined link is a periodic CSI-RS 920, an aperiodic channel state may be estimated based on a channel measured at an existing periodic CSI-RS resource, and when a resource supported for channel measurement in a resource setting connected to a predetermined link is an aperiodic CSI-RS 940, aperiodic channel state reporting may be estimated based on a channel measured at an aperiodically configured CSI-RS resource. In this case, a slot offset between channel state reporting and DCI including triggering between an aperiodic CSI-RS and aperiodic channel state reporting trigger may be transmitted through higher layer signaling.

In this case, the base station may configure a resource for interference measurement and a desired signal to a terminal through a resource setting of FIG. 7 to support channel state reporting. The following RRC parameters may be considered for a resource setting. Table 12 shows CSI-RS Resource Config for a resource setting.

TABLE 12

| Parameter name | Description | Vaule range |
| --- | --- | --- |
| CSI-RS-ResourceConfig | CSI-RS resource configuration | |
| CSI-RS-ResourceConfigId | CSI-RS resource configuration ID | 0 . . . CSI-RS-ResourceMax − 1 |
| ResourceConfigType | Time domain behavior of resource configuration | aperiodic, semi-persistent, or periodic |
| CSI-ResourcePeriodicityAndOffset | Contains periodicity and slot offset for periodic/semi-persistent CSI-RS | |
| NrofPorts | Number of ports | 1, 2, 4, 8, 12, 16, 24, 32 |
| CSI-RS-ResourceMapping | Include parameters to capture OFDM symbol and subcarrier occupancy of the CSI-RS resource within a slot | |
| CDMType | Includes parameters to capture CDM value (1, 2, 4, or 8), CDM pattern (freq only, time and freq, time only) | |
| CSI-RS-Density | Density of CSI-RS resource measured in RE/port/PRB | e.g., ½, 1, >1 |
| CSI-RS-FreqBand | Includes parameters to enbale configuration of wideband and partial band CSI-RS | |
| Pc | Power offset of NZP CSI-RS RE to PDSCH RE | |
| Pc-SS | Power offset of NZP CSI-RS RE to SS/PBCH block | |
| ScramblingID | Scambling ID | |
| CSI-RS-ResourceRep | Configuration of CSI-RS resource repetition | |

NR may support beam measurement, reporting, and management based on the resource setting. In this case, each field is used for the following purpose.

NZP-CSI-RS-Resource ConfigID: IDs of CSI-RS resource configurations

NrofPorts: The number of CSI-RS ports included in a CSI-RS resource

CSI-RS-timeConfig: A transmission period and a slot offset of the CSI-RS resource CSI-RS-ResourceMapping: A symbol location in a slot of the CSI-RS resource and a subcarrier location in a PRB CSI-RS-Density: A frequency density of the CSI-RS CDMType: A CDM length of the CSI-RS and a CDM RE pattern CSI-RS-FreqBand: A transmission bandwidth and a start location of the CSI-RS Pc: A ratio between a PDSCH energy per RE (EPRE) and an NZP CSI-RS EPRE Pc-SS: A ratio between an SS/PBCH block EPRE and an NZP CSI-RS EPRE CSI-RS-ResourceRep: A configuration of CSI-RS resource repetition (reception beam repetition) for reception beam determination of the terminal According to an embodiment of the disclosure, for a CSI-RS resource setting, in NR, the number of CSI-RS ports may be configured from among {1, 2, 4, 8, 12, 16, 24, 32}, and a different configuration degree of freedom may be supported according to the number of CSI-RS ports configured for a CSI-RS resource. Table 12-1 shows a CSI-RS density configurable according to the number X of NR CSI-RS ports (X), a CDM length and type, a frequency axis and time axis start location ($\bar{k}$, $\bar{l}$) of a CSI-RS component RE pattern, and the number (k') of REs on a frequency axis and the number (l') of REs on a time axis of the CSI-RS component RE pattern.

According to an embodiment of the disclosure, the CSI-RS component RE pattern that is a basic unit constituting the CSI-RS resource may include YZ REs including adjacent (Y=1+max(k')) REs on the frequency axis adjacent (Z=1+max(|l'|) REs on the time axis. Referring to Table 12-1, NR supports a different frequency axis configuration degree of freedom according to the number of CSI-RS ports configured for the CSI-RS resource. When the number of CSI-RS ports is 1, a configuration may be performed without a limitation of a subcarrier in a PRB, and a CSI-RS RE location may be designated by a 12-bit bitmap. When the number of CSI-RS ports is one of {2, 4, 8, 12, 16, 24, 32} and Y=2, a configuration may be performed for every two subcarriers, and a CSI-RS RE location may be designated by a 6-bit bitmap. When the number of CSI-RS ports is 4 and Y=4, a configuration may be performed for every four subcarriers in a PRB, and a CSI-RS RE location may be designated by a 3-bit bitmap. Likewise, a time axis RE location may be designated by a total 14-bit bitmap. In this case, although a length of a bitmap may vary as in frequency location designation according to a Z value of Table 12-1, the principle corresponds to the above description, and thus a detailed explanation will not be given.

TABLE 12-1

| Row | Ports $X$ | Density $\rho$ | Ccdm-Type | ($\bar{k}$, $\bar{l}$) | CDM group index j | k' | l' |
|---|---|---|---|---|---|---|---|
| 1 | 1 | 3 | No CDM | ($k_0$, $l_0$), ($k_0$ + 4, $l_0$), ($k_0$ + 8, $l_0$) | 0, 0, 0 | 0 | 0 |
| 2 | 1 | 1, 0.5 | No CDM | ($k_0$, $l_0$) | 0 | 0 | 0 |
| 3 | 2 | 1, 0.5 | FD-CDM2 | ($k_0$, $l_0$) | 0 | 0, 1 | 0 |
| 4 | 4 | 1 | FD-CDM2 | ($k_0$, $l_0$), ($k_0$ + 2, $l_0$) | 0, 1 | 0, 1 | 0 |
| 5 | 4 | 1 | FD-CDM2 | ($k_0$, $l_0$), ($k_0$, $l_0$ + 1) | 0, 1 | 0, 1 | 0 |
| 6 | 8 | 1 | FD-CDM2 | ($k_0$, $l_0$), ($k_1$, $l_0$), ($k_2$, $l_0$), ($k_3$, $l_0$) | 0, 1, 2, 3 | 0, 1 | 0 |
| 7 | 8 | 1 | FD-CDM2 | ($k_0$, $l_0$), ($k_1$, $l_0$), ($k_0$, $l_0$ + 1), ($k_1$, $l_0$ + 1) | 0, 1, 2, 3 | 0, 1 | 0 |
| 8 | 8 | 1 | CDM4 (FD2, TD2) | ($k_0$, $l_0$), ($k_1$, $l_0$) | 0, 1 | 0, 1 | 0, 1 |
| 9 | 12 | 1 | FD-CDM2 | ($k_0$, $l_0$), ($k_1$, $l_0$), ($k_2$, $l_0$), ($k_3$, $l_0$), ($k_4$, $l_0$), ($k_5$, $l_0$) | 0, 1, 2, 3, 4, 5 | 0, 1 | 0 |
| 10 | 12 | 1 | CDM4 (FD2, TD2) | ($k_0$, $l_0$), ($k_1$, $l_0$), ($k_2$, $l_0$) | 0, 1, 2 | 0, 1 | 0, 1 |
| 11 | 16 | 1, 0.5 | FD-CDM2 | ($k_0$, $l_0$), ($k_1$, $l_0$), ($k_2$, $l_0$), ($k_3$, $l_0$), ($k_0$, $l_0$ + 1), ($k_1$, $l_0$ + 1), ($k_2$, $l_0$ + 1), ($k_3$, $l_0$ + 1) | 0, 1, 2, 3, 4, 5, 6, 7 | 0, 1 | 0 |
| 12 | 16 | 1, 0.5 | CDM4 (FD2, TD2) | ($k_0$, $l_0$), ($k_1$, $l_0$), ($k_2$, $l_0$), ($k_3$, $l_0$) | 0, 1, 2, 3 | 0, 1 | 0, 1 |
| 13 | 24 | 1, 0.5 | FD-CDM2 | ($k_0$, $l_0$), ($k_1$, $l_0$), ($k_2$, $l_0$), ($k_0$, $l_0$ + 1), ($k_1$, $l_1$ + 1), ($k_2$, $l_0$) ($k_0$, $l_1$), ($k_1$, $l_1$), ($k_2$, $l_1$), ($k_0$, $l_1$ + 1), ($k_1$, $l_1$ + 1), ($k_2$, $l_1$, + 1) | 0, 1, 2, 3, 4, 5, 6, 7, 8, 9, 10, 11 | 0, 1 | 0 |

TABLE 12-1-continued

| Row | Ports $\chi$ | Density $\rho$ | Ccdm-Type | $(\bar{k}, \bar{l})$ | CDM group index j | k' | l' |
|---|---|---|---|---|---|---|---|
| 14 | 24 | 1, 0.5 | CDM4 (FD2, TD2) | $(k_0, l_0)$, $(k_1, l_0)$, $(k_2, l_0)$, $(k_0, l_1)$, $(k_1, l_1)$, $(k_2, l_1)$ | 0, 1, 2, 3, 4, 5 | 0, 1 | 0, 1 |
| 15 | 24 | 1, 0.5 | CDM8 (FD2, TD4) | $(k_0, l_0)$, $(k_1, l_0)$, $(k_2, l_0)$ | 0, 1, 2 | 0, 1 | 0, 1, 2, 3 |
| 16 | 32 | 1, 0.5 | FD-CDM2 | $(k_0, l_0)$, $(k_1, l_0)$, $(k_2, l_0)$, $(k_3, l_0)$, $(k_0, l_0 + 1)$, $(k_1, l_0 + 1)$, $(k_2, l_0 + 1)$, $(k_3, l_0, + 1)$, $(k_0, l_1)$, $(k_1, l_1)$, $(k_2, l_1)$, $(k_3, l_1)$, $(k_0, l_1 + 1)$, $(k_1, l_1 + 1)$, $(k_2, l_1 + 1)$, $(k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0)$, $(k_1, l_0)$, $(k_2, l_0)$, $(k_3, l_0)$, $(k_0, l_1)$, $(k_1, l_1)$, $(k_2, l_1)$, $(k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0)$, $(k_1, l_0)$, $(k_2, l_0)$, $(k_3, l_0)$ | 0, 1, 2, 3 | 0, 1 | 0, 1, 2, 3 |

In NR, a tracking RS (TRS) may be configured for fine time/frequency tracking of the terminal based on the CSI-RS. Although the TRS may be referred to as CSI-RS for tracking or the like according to the standards, the TRS is used for convenience of explanation in the disclosure. The TRS may have a specific period of 10 ms, 20 ms, or the like, and may be transmitted in one (X=1) or two (X=2) consecutive slots, which is referred to as a TRS burst.

Figure 9B:
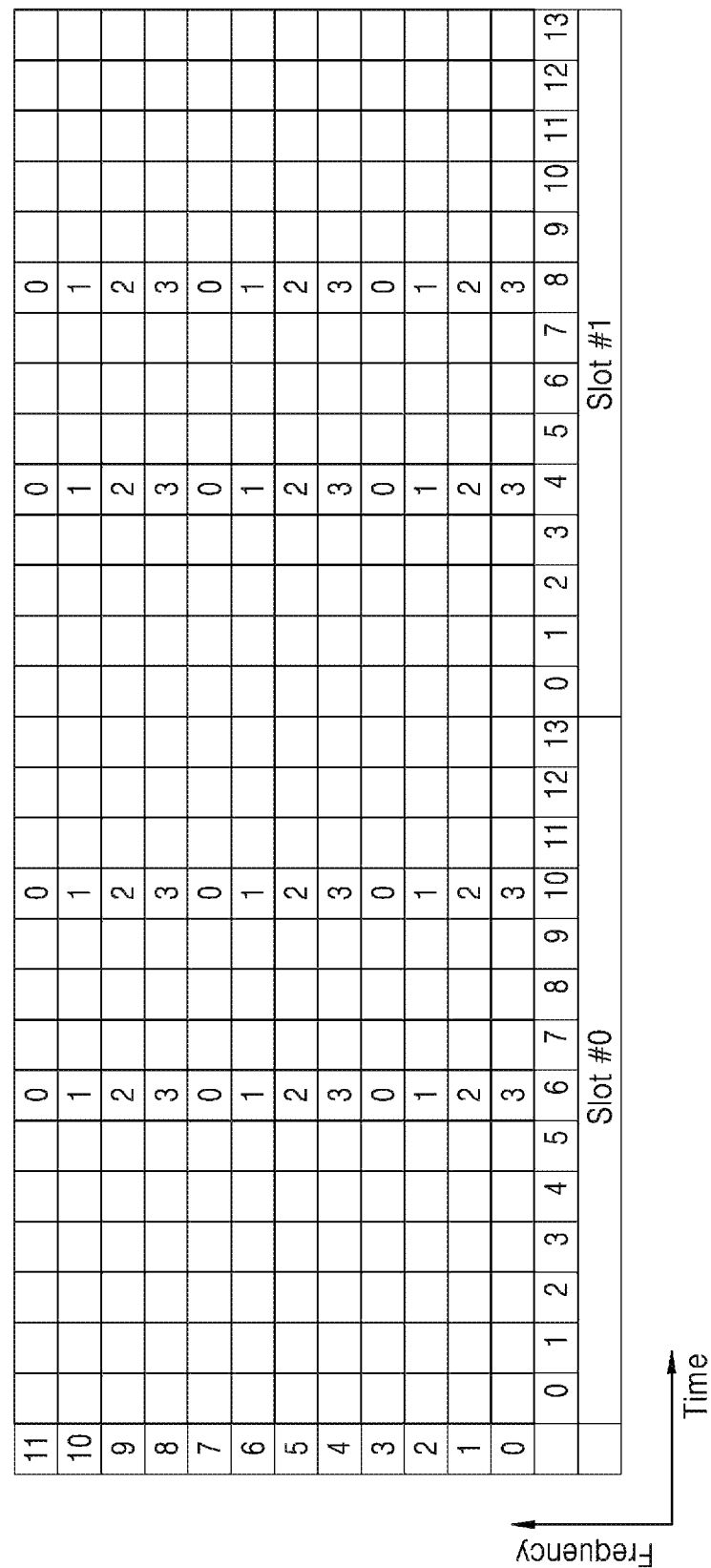
FIG. 9B is a diagram illustrating a reference element (RE) pattern of a tracking RS (TRS), according to an embodiment of the disclosure.
Figure 9C:
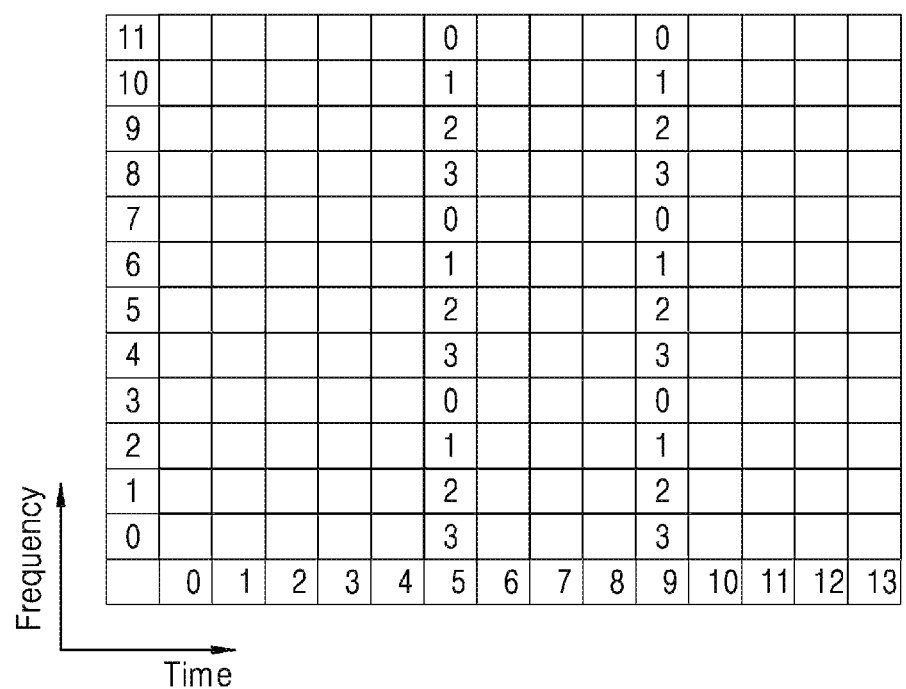
FIG. 9C is a diagram illustrating an RE pattern of a TRS, according to an embodiment of the disclosure.

FIGS. 9B and 9C illustrate an RE pattern of a TRS according to various embodiments of the disclosure.

Referring to FIGS. 9B and 9C, diagrams illustrating TRS patterns when a TRS burst is X=1 and X=2 are provided. As shown in FIGS. 9B and 9C, a TRS has a frequency RE density of three RE/RB/ports and an RE may be repeated for every four subcarriers. (That is, one TRS port is transmitted in one RE(s) from among 0, 1, 2, and 3 REs represented in TRS OFDM symbol REs of FIG. 9B or 9C.) Also, according to an embodiment of the disclosure, the TRS may be transmitted in one of three OFDM symbol pairs [{5th, 9th}, {6th, 10th}, and {7th, 11th}] in a frequency band equal to or less than 6 GHz that is referred to as a frequency range 1 (FR1), and may be transmitted in one of ten OFDM symbol pairs [{1st, 5th}, {2th, 6th}, {3rd, 7th}, {4th, 8th}, {5th, 9th}, {6th, 10th}, {7th, 11th}, {8th, 12th}, {9th, 13th}, and {10th, 14th}] in a frequency band equal to or greater than 6 GHz that is referred to as a frequency range 2 (FR2). In FIGS. 9B and 9C, an OFDM symbol location is an example of a TRS configuration and an actual transmission location may vary according to the transmission of a base station.

Figure 9D:
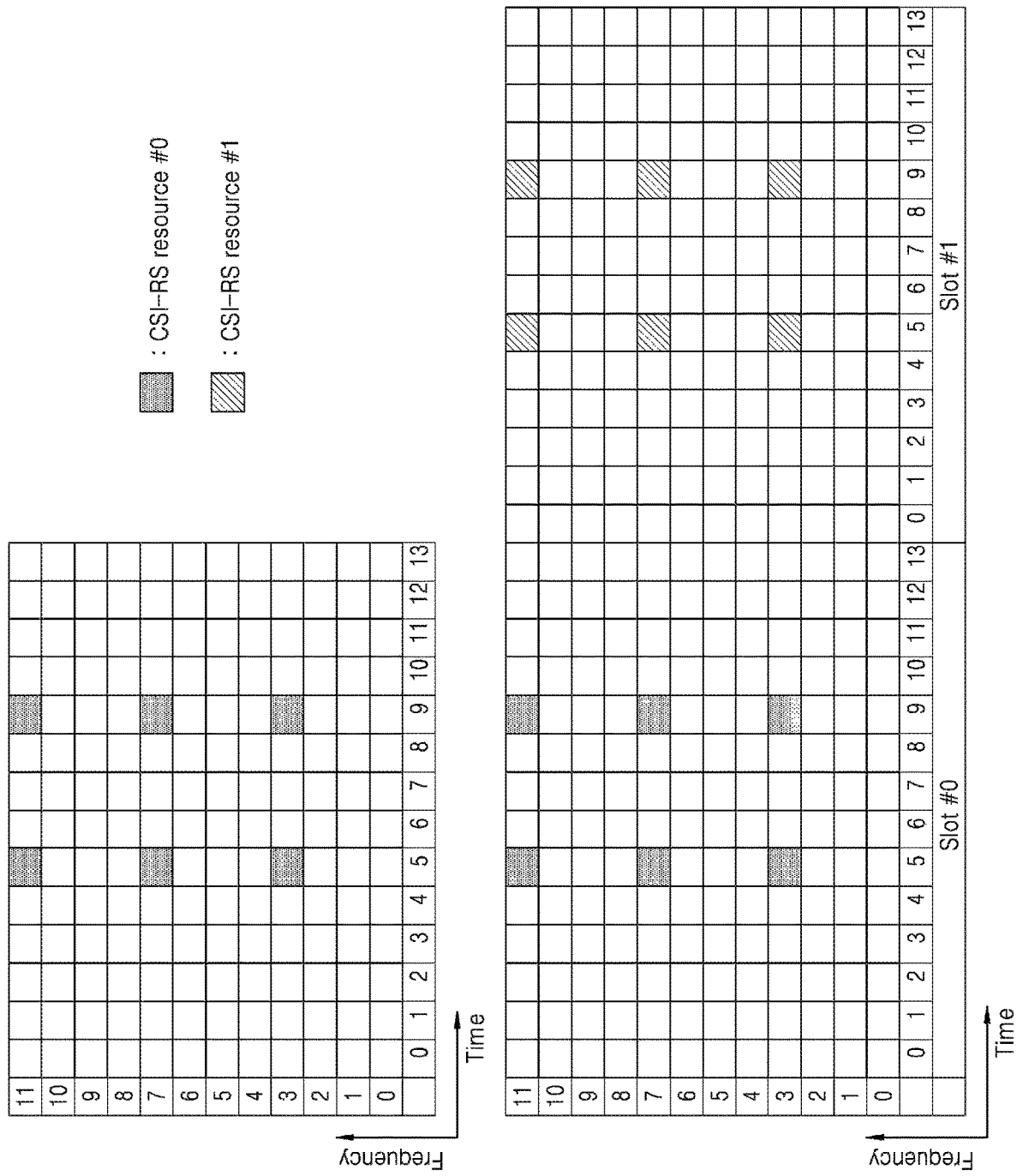
FIG. 9D is a diagram illustrating a 1-port CSI-RS configuration according to an embodiment of the disclosure.

FIG. 9D is a diagram illustrating a 1-port CSI-RS configuration according to an embodiment of the disclosure.

Referring to FIG. 9D, an example of a 1-port CSI-RS configuration for covering a TRS RE pattern of FIGS. 9B and 9C is illustrated. As shown in FIG. 9D, a base station may configure one resource set for one resource setting by using higher layer signaling and may configure up to two CSI-RS resources within the resource set. In this case, a frequency density of a CSI-RS may be set to 3 RE/RB/ports. When X=1 TRS burst, the base station may configure only CSI-RS resource #0, and when X=2 TRS burst, the base station may configure both CSI-RS resources #0 and #1. When X=2 TRS burst, the base station may configure a CSI-RS-ResourceRep parameter to 'ON', and may allow a terminal to perform continuous time/frequency tracking by assuming the same transmission beam for all 1-port CSI-RSs. In another example, when CSI-RS resources are configured for a TRS, for example, when there is no corresponding reporting setting (i.e., there is no reporting setting referring to the CSI-RS resources) or it is explicitly configured that time/frequency tracking may be performed through a CSI-RS, the terminal may promise that CSI-RS ports belonging to the CSI-RS resources are assumed to be the same antenna port regardless of a ResourceRep parameter configuration for each CSI-RS resource.

Figure 9E:
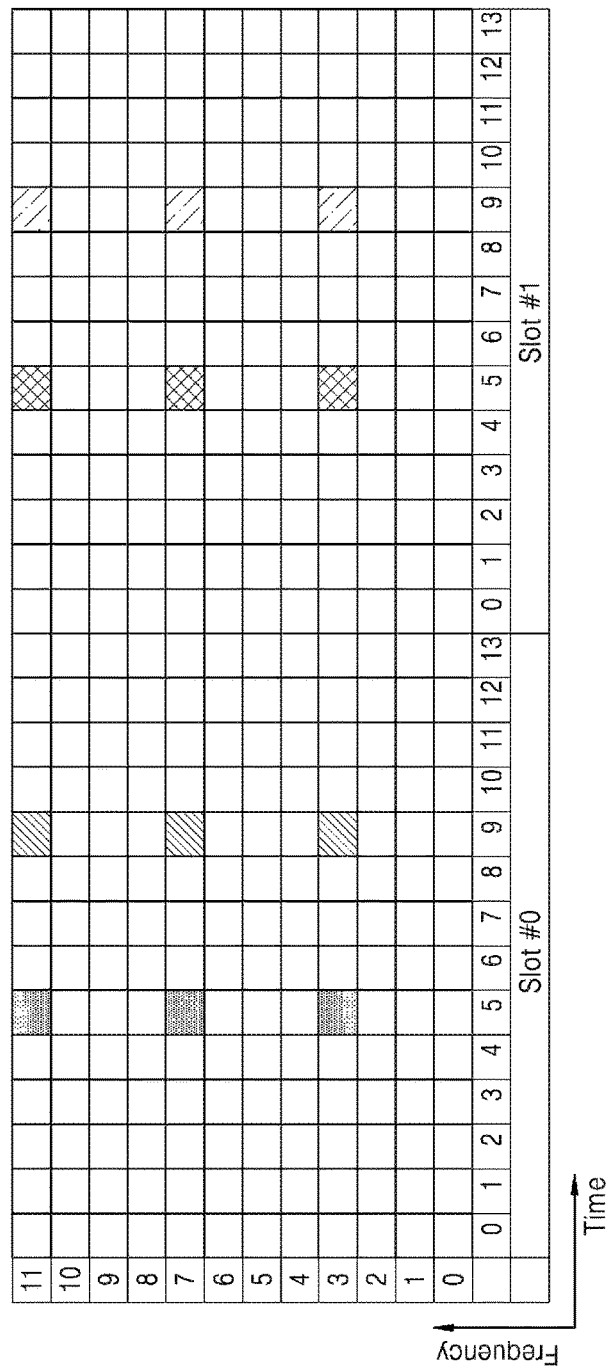
FIG. 9E is a diagram illustrating a 1-port CSI-RS configuration according to an embodiment of the disclosure.
Figure 9E:
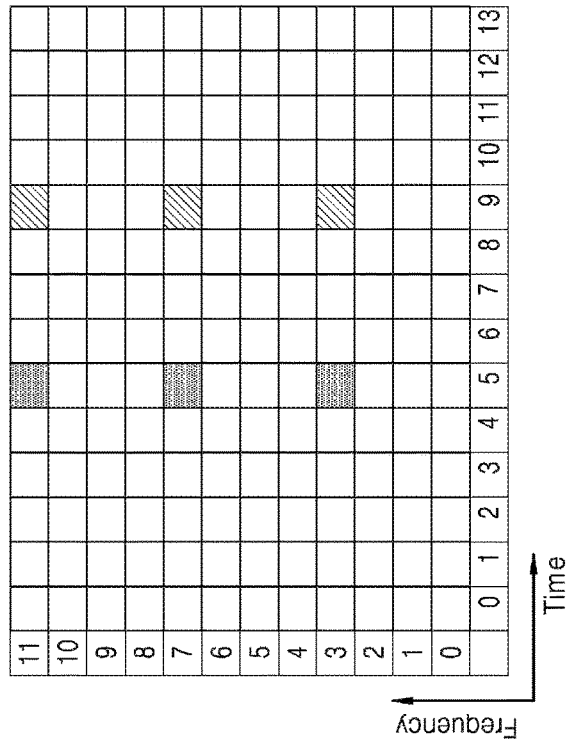

FIG. 9E is a diagram illustrating a 1-port CSI-RS configuration according to an embodiment of the disclosure.

Referring to FIG. 9E, an example of a 1-port CSI-RS configuration for covering a TRS RE pattern of FIGS. 9B and 9C is illustrated. As shown in FIG. 9E, a base station may configure one resource set for one resource setting by using higher layer signaling and may configure up to four CSI-RS resources within the resource set. In this case, a frequency density of a CSI-RS is set to 3 RE/RB/ports. When X=1 TRS burst, the base station configures CSI-RS resources #0 and #1, and when X=2 TRS burst, the base station configures all of CSI-RS resources #0, #1, #2, and #3. When X=1 or X=2 TRS burst, the base station may configure a CSI-RS-ResourceRep parameter to 'ON', and may allow a terminal to perform continuous time/frequency tracking by assuming the same transmission beam for all 1-port CSI-RSs. In another example, when CSI-RS resources are configured for a TRS, for example, when there is no corresponding reporting setting (i.e., there is no reporting setting referring to the CSI-RS resources) or it is explicitly configured that time/frequency tracking may be performed through a CSI-RS, the terminal may promise that CSI-RS ports belonging to the CSI-RS resources are assumed to be the same antenna port regardless of a ResourceRep parameter configuration for each CSI-RS resource.

As illustrated in FIGS. 9D and 9E, a subcarrier location and an OFDM symbol location of 1-port CSI-RS resources may appropriately vary according to a TRS subcarrier location of FIGS. 9B and 9C.

Also, according to an embodiment of the disclosure, a TRS may be transmitted periodically, semi-persistently, or aperiodically. A periodic TRS (P-TRS) may be periodically transmitted before an RRC reconfiguration according to a period and a slot offset value configured through RRC, a semi-persistent TRS (SP-TRS) may be transmitted until it is inactivated after being activated by MAC CE or DCI based on a period and a slot offset configured through RRC, and an aperiodic TRS (A-TRS) may be triggered by DCI and transmitted without configuring a period or a slot offset value.

A-TRS triggering and A-TRS transmission timing may have an offset (between triggering and transmission timing) configured through higher layer or may follow a pre-promised value (e.g., so that an A-TRS is transmitted in the same slot as the A-TRS triggering). In the case of an aperiodic TRS (A-TRS), the number of time axis REs may be insufficient and it may be difficult to measure statistical characteristics of a channel, the aperiodic TRS may be associated with a periodic TRS. Association between the A-TRS and the P-TRS may be supported by using various methods such as quasi co-location (QCL). For example, the base station may configure at least one SP-TRS or P-TRS for an A-TRS as a QCL reference RS to extract channel statistical values such as delay spread, average delay, Doppler spread, and Doppler shift (QCL type A) or to extract spatial parameters such as a TX beam and an RX beam (QCL type D).

NR MIMO supports a large number of antennas and transmission/reception in a high frequency band such as 28 GHz. Wireless communication using such a millimeter wave exhibits high linearity and high path loss due to the characteristics of the band, and in order to address the problem, hybrid beamforming in which analog beamforming based on phase shifting of an antenna and a radio frequency (RF) and digital beamforming based on digital precoding are combined is required.

Figure 10:
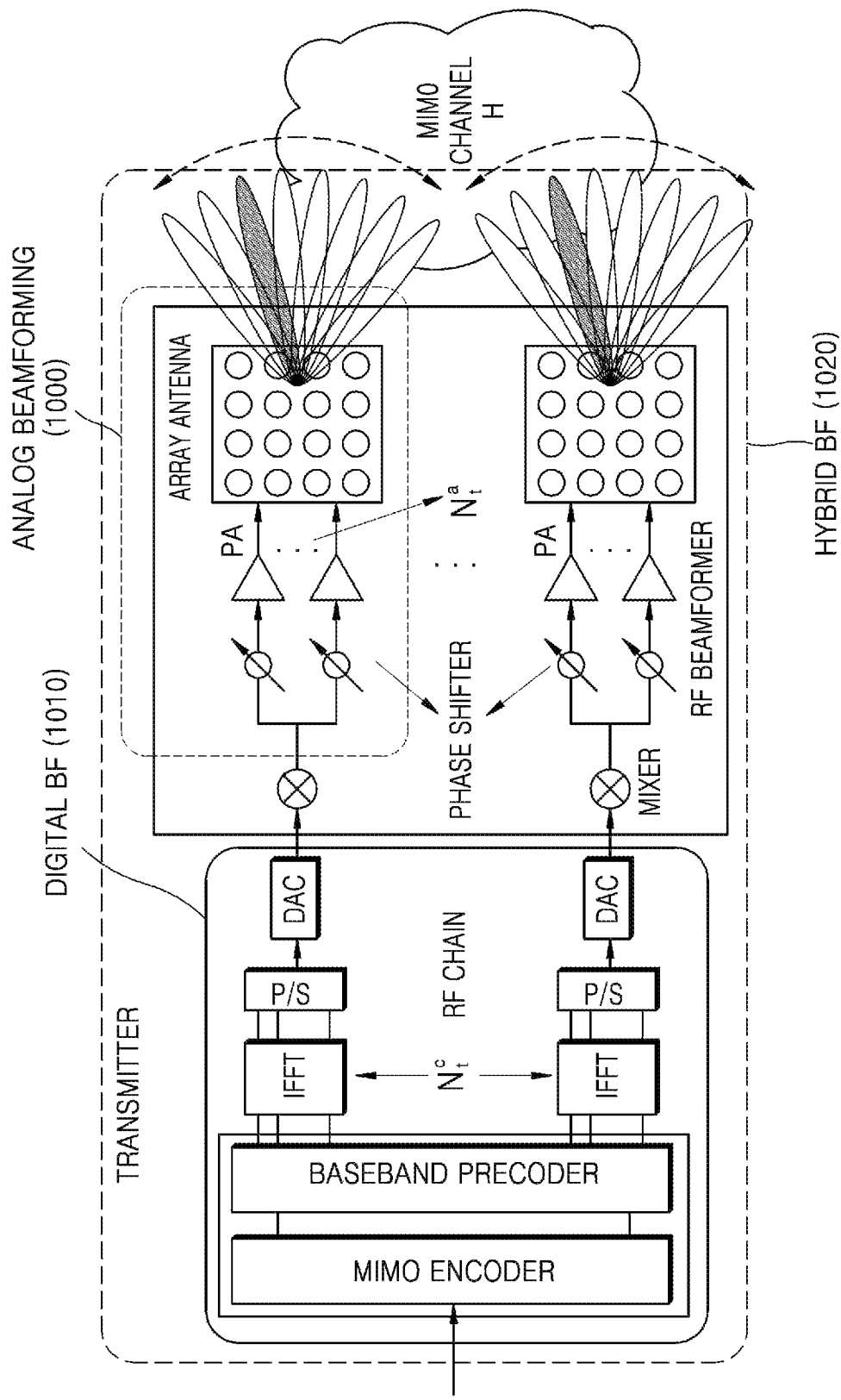
FIG. 10 is a diagram illustrating an example where an aperiodic interference measurement resource is indirectly indicated by using an aperiodic channel state reporting indication field, according to an embodiment of the disclosure.

FIG. 10 is a diagram illustrating an example where an aperiodic interference measurement resource is indirectly indicated by using an aperiodic channel state reporting indication field, according to an embodiment of the disclosure.

Referring to FIG. 10, a base station and a terminal include an RF chain and a phase shifter for digital beamforming and analog beamforming. Analog beamforming 1000 at a transmitter side is a method of changing a phase of a signal transmitted from each antenna through a phase shifter and concentrating the signal in a specific direction when signals are transmitted by using a plurality of antennas. To this end, an array antenna in which a plurality of antenna elements are aggregated is used. When such transmission beamforming is used, because an arrival distance of signal waves may be increased and signals are hardly transmitted in directions other than the direction, interference on other users may be considerably reduced. Likewise, a receiver side may perform reception beamforming by using a reception array antenna, and in this case, the sensitivity of received signals entering in a specific direction may be increased by concentrating the reception of radio waves in the direction, and an interference signal may be blocked by excluding signals entering in directions other than the direction from the received signals.

A required distance between antennas is proportional to a wavelength of a transmission frequency (e.g., a half-wavelength interval). Accordingly, because a wavelength of a radio wave decreases as a transmission frequency increases, an array may include more antenna elements within the same area. Accordingly, because a communication system operating in a high frequency band may obtain a relatively high antenna gain in comparison with using beamforming technology in a low frequency band, the communication system operating in the high frequency band is well positioned to apply the beamforming technology.

In beamforming technology, in order to obtain a higher antenna gain, hybrid beamforming 1020 in which digital precoding 1010 used to obtain a high data rate in an existing multi-antenna system is combined with analog beamforming technology may be used. In hybrid beamforming, when a beam is formed via analog beamforming, and one or more analog beams are formed, a signal is transmitted by employing digital precoding similar to that applied in existing multiple antennas in a baseband, and thus a more reliable signal may be received and a higher system capacity may be expected.

Figure 11:
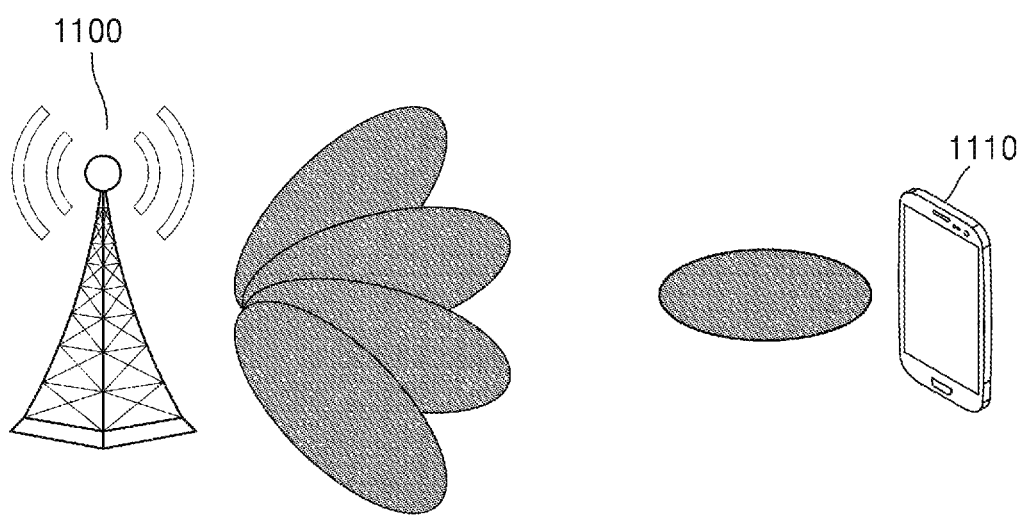
FIG. 11 is a diagram illustrating reference signal transmission necessary for a beam sweeping operation of a base station, according to an embodiment of the disclosure.
Figure 12:
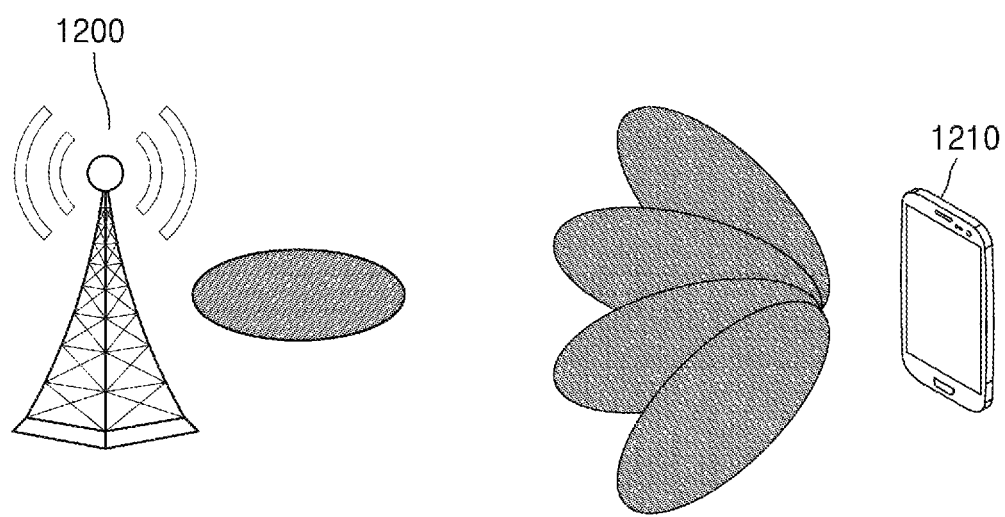
FIG. 12 illustrates an example of a beam sweeping operation of a terminal, according to an embodiment of the disclosure.
Figure 13:
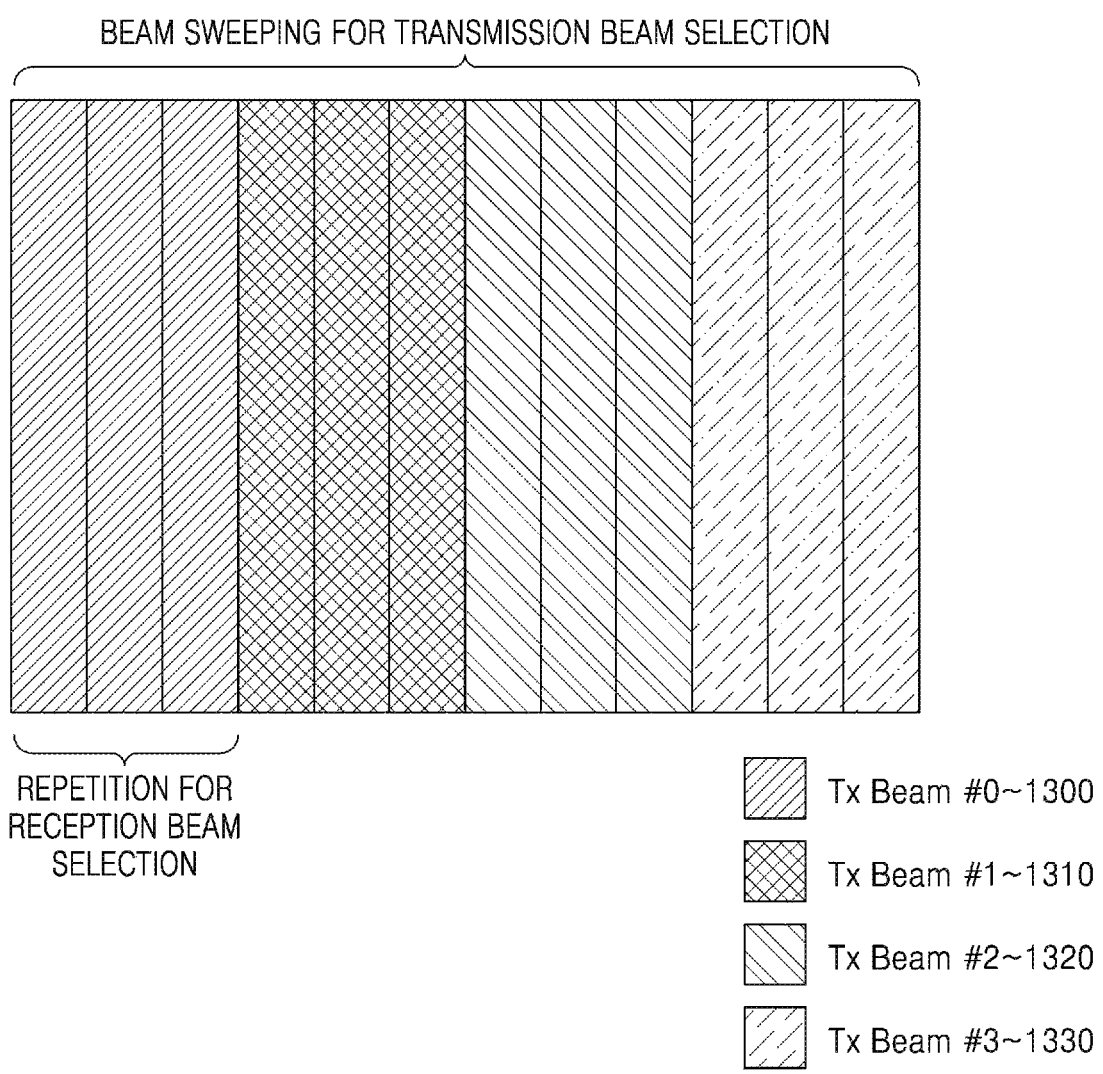
FIG. 13 illustrates an example of reference signal transmission for an operation of selecting a transmission beam of a base station and a reception beam of a terminal of FIGS. 11 and 12, according to an embodiment of the disclosure.

When beamforming is applied, it is important to select a beam direction optimized for a base station and a terminal. In order to select an optimized beam direction, the base station and the terminal may support beam sweeping by using a plurality of time and frequency resources. FIGS. 11, 12, and 13 are diagrams illustrating a beam sweeping operation of a terminal and a base station.

FIG. 11 is a diagram illustrating reference signal transmission necessary for a beam sweeping operation of a base station, according to an embodiment of the disclosure.

Referring to FIG. 11, a base station 1100 may transmit a plurality of transmission beams to a terminal 1110 for transmission beam selection of the base station 1100, and the terminal 1110 may determine a beam optimal to transmit data to the terminal 1110 and may notify the optimal beam to the base station 1100.

FIG. 12 illustrates an example of a beam sweeping operation of a terminal, according to an embodiment of the disclosure.

Referring to FIG. 12, a base station 1200 may repeatedly transmit the same beam for reception beam selection of a terminal 1210, and the terminal 1210 may determine a reception beam of the terminal 1210 for each beam based on the repeated transmission and may notify the reception beam to the base station 1200 or may use the reception beam of the terminal 1210 determined according to a base station transmission beam indicated by the base station 1200.

FIG. 13 illustrates an example of reference signal transmission for an operation of selecting a transmission beam of a base station and a reception beam of a terminal of FIGS. 11 and 12, according to an embodiment of the disclosure.

Referring to FIG. 13, a terminal or a base station transmits a reference signal by using a different beam in each time resource to select a beam for the terminal or the base station. In this case, the base station or the terminal having received the reference signal may measure the quality of the reference signal based on a CQI or reference signal received power (RSRP) of the reference signal and may select one or more transmission or reception beams according to a measurement result. Although one reference signal is transmitted based on a different beam through a different time resource in FIG. 13, a different beam may be transmitted through a different frequency, cyclic shift, and code resource. In this case, as shown in FIG. 13, the base station or the terminal may transmit a plurality of transmission beams (e.g., transmission beams #0 through #3 1300, 1310, 1320, and 1330) for transmission beam sweeping, or may repeatedly apply and transmit one transmission beam for reception beam sweeping.

A beam management operation such as beam sweeping is also performed based on periodic, semi-persistent, or aperiodic CSI-RS transmission and channel state reporting/beam reporting and a channel state reporting framework (e.g., a resource setting, a channel state reporting setting, a channel measurement setting, or a link) of FIGS. 7 and 9A through 9E.

When channel state reporting or beam reporting is supported, for a resource setting in NR, a plurality of CSI-RS resources may be configured into a CSI-RS resource set to transmit a plurality of beam transmission for transmission beam sweeping or to repeatedly transmit one transmission beam for reception beam sweeping, and whether the CSI-RS resources are individual CSI-RS resources or the CSI-RS resource is repeated may be configured, and to this end, RRC configuration parameters in Table 13 may be provided. Table 13 shows parameters in CSI-RS Resource Set Config for a CSI-RS resource set configuration.

TABLE 13

| Parameter name | Description | Vaule range |
|---|---|---|
| Nzp-CSI-ResourceSetId | NZP CSI-RS Resource Set ID | |
| Nzp-CSI-RS-Resources | Configuration of NZP CSI-RS Resources in the Resource Set | SEQUENCE (SIZE (1 . . . maxNrofNZP-CSI-RS-ResourcesPerSet)) OF NZP-CSI-RS-ResourceId |
| repetition | Configuration of repetition | {on, off} |
| aperiodicTriggeringOffset | Aperiodic NZP CSI-RS offset | 0, . . . , 4 |
| trs-Info | Usage for TRS | |

As shown in a configuration of Table 13, a plurality of NZP CSI-RS resources may be configured through Nzp-CSI-RS-Resources into a resource set, information (trs-Info) about whether to use TRS for each CSI-RS resource set may be configured, and in the case of an aperiodic CSI-RS, a slot offset for transmission may be configured through aperiodicTriggeringOffset. Also, whether a CSI-RS resource is repeated may be configured, and thus when the terminal measures CSI-RS resources configured into the CSI-RS resource set and generates channel state information or beam information, whether the CSI-RS resources are assumed to be transmitted based on different beams for base station transmission beam sweeping (that is, the NZP CSI-RS resources are assumed to use different spatial domain transmission filters) or each CSI-RS resource is assumed to be transmitted based on the same beam for terminal reception beam sweeping (that is, all of the NZP CSI-RS resources are assumed to use the same spatial domain transmission filter) may be configured.

In this case, when it is configured that the CSI-RS resource is repeated in the CSI-RS resource set configuration, only a 1-port CSI-RS or a 1 or 2-port CSI-RS resource may be configured as each CSI-RS resource. When transmission beam sweeping and reception beam sweeping of FIG. 13 are performed, the number of transmission beams may be large such as 128, and the number may increase in consideration of reception beam sweeping. Accordingly, when the number of antenna ports is limited to 1 or 2 ports to configure CSI-RS resources necessary for sweeping, an overhead necessary for reference signal transmission may be reduced and more efficient beam management may be performed.

In addition, when the CSI-RS resource is repeated and a period of CSI-ResourcePeriodicityAndOffset and NrofPorts is configured, a different configuration may not be allowed or may be disregarded. This is because it is difficult for the terminal to use a CSI-RS in the same OFDM symbol to measure the quality of a different reception beam in sweeping a plurality of reception beams of the terminal.

In addition, when the CSI-RS resource is repeated, regarding configurations other than a CSI-RS-ResourceMapping configuration, that is, ResourceConfigType, CSI-RS-timeConfig, NrofPorts, CDMType, CSI-RS-Density, CSI-RS-FreqBand, Pc, and ScramblingID, the terminal may not allow or disregard a different configuration for each CSI-RS resource. This is because while the terminal sweeps a plurality of reception beams of the terminal, when densities of CSI-RS are different, it may be difficult to relatively compare RSRPs or CQIs for beam measurement. When transmission occurs frequently at one CSI-RS resource while transmission occurs relatively infrequently at a different CSI-RS resource due to a difference in a CSI-RS period, it is difficult to completely perform reception beam sweeping required by the terminal. In addition, when Pc that is a boosting value of CSI-RS power or CSI-RS-FreqBand that is a transmission frequency band is configured differently for the same beam transmission, an RSRP may vary according to each reception beam, and the accuracy may be lowered even when the terminal corrects the RSRP. Accordingly, when the CSI-RS resource is repeated for reception beam sweeping, in order to reduce the hardware implementation complexity of the terminal and efficiently perform terminal reception beam sweeping in a CSI-RS repetition configuration, a configuration of the CSI-RS resources included in the CSI-RS resource set may be limited.

In order to provide beam information necessary to transmit a control channel, data, and a reference signal for a beam-based wireless communication system operation, a transmission configuration indication (TCI) state may be configured. Table 14 shows a TCI state configuration of RRC.

TABLE 14

```
-- ASN1START
-- TAG-TCI-STATE-START
TCI-State ::=           SEQUENCE {
        tci-StateId               TCI-StateId,
        qcl-Type1     QCL-Info,
        qcl-Type2     QCL-Info
        ...
}
QCL-Info ::=    SEQUENCE {
        cell          ServCellIndex
        bwp-Id        BWP-Id
        referenceSignal           CHOICE {
            csi-rs                NZP-CSI-RS-ResourceId,
            ssb                   SSB-Index
        },
        qcl-Type      ENUMERATED {typeA, typeB, typeC, typeD},
        ...
}
-- TAG-TCI-STATE-STOP
-- ASN1STOP
```

As shown in Table 14, a CSI-RS or an SSB for referring to beam information (QCL Type-D) may be configured in each TCI state, and thus the terminal may use the beam information obtained through the CSI-RS or the SSB that is previously transmitted to receive the control channel, the data, and the reference signal. Up to 128 TCI states may be configured, and the configured TCI states are divided and used for the control channel, the data, and the reference signal.

Figure 14:
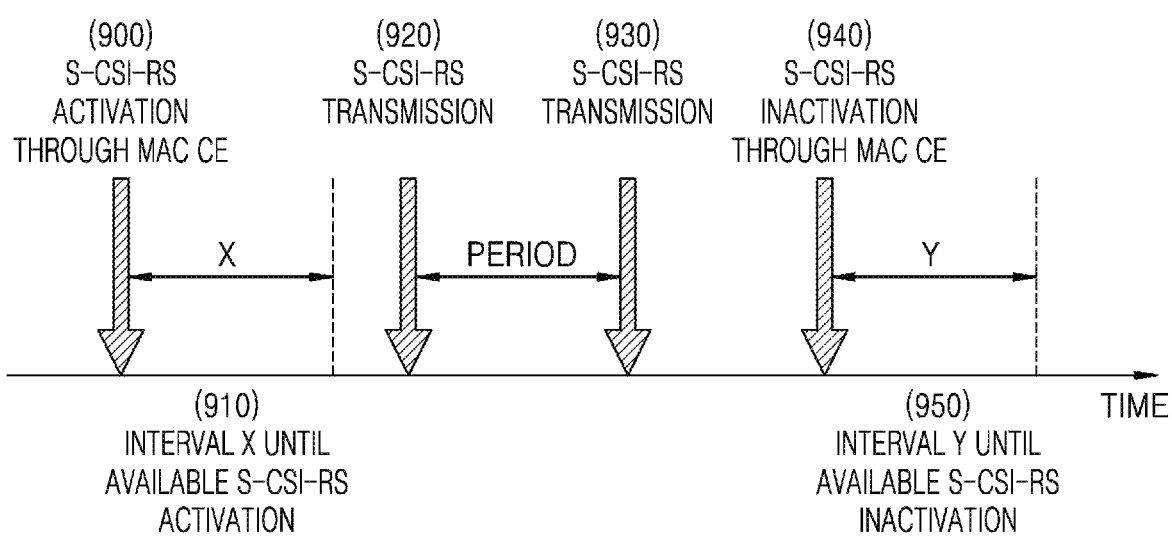
FIG. 14 is a diagram illustrating a semi-persistent CSI-RS configuration and an activation/inactivation operation, according to an embodiment of the disclosure.

FIG. 14 is a diagram illustrating a semi-persistent CSI-RS configuration and an activation/inactivation operation, according to an embodiment of the disclosure.

Referring to FIG. 14, the semi-persistent CSI-RS is activated/deactivated through MAC CE (Control element).

Figure 15:
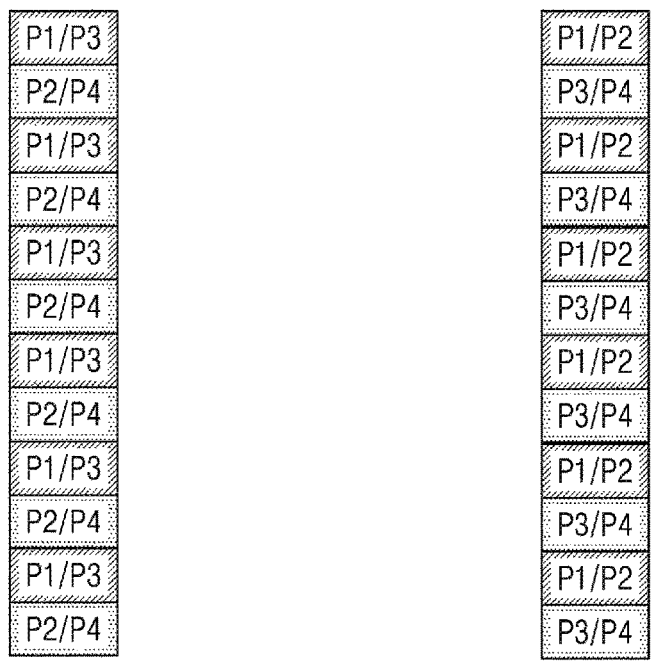
FIG. 15 illustrates a demodulation reference signal (DMRS) configuration 1 in an NR system, according to an embodiment of the disclosure.
Figure 15:
Figure 16:
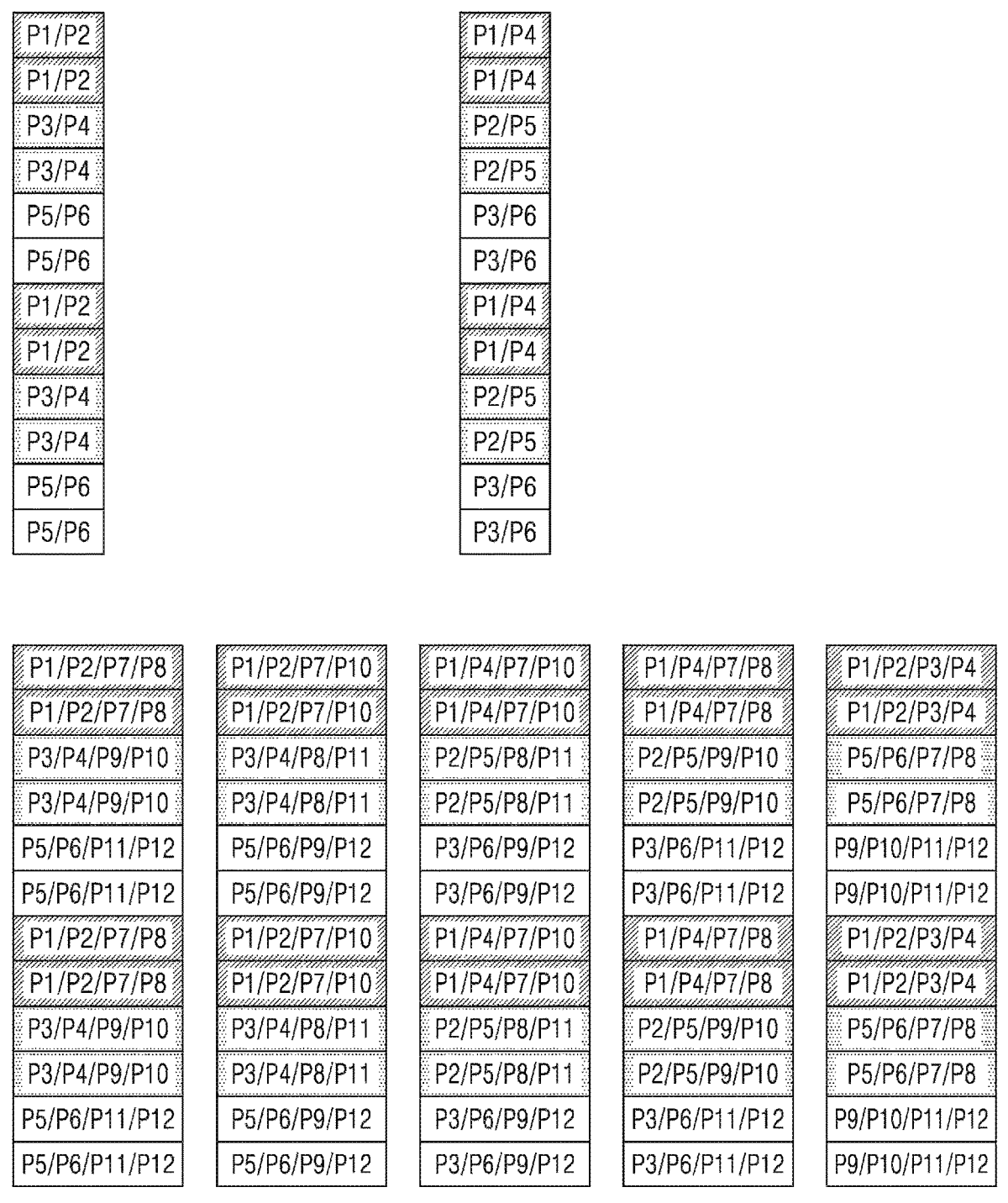

FIGS. 15 and 16 are diagrams illustrating a DMRS pattern that may be supported in a 5G or NR system. More specifically, FIG. 15 illustrates a DMRS configuration 1 in an NR system, according to an embodiment of the disclosure and FIG. 16 illustrates a DMRS configuration 2 in an NR system, according to an embodiment of the disclosure.

Referring to FIGS. 15 and 16, in a 5G or NR system, two types of DMRS configurations (configuration 1 and configuration 2) may be supported. However, the disclosure is not limited to the above example.

FIG. 15 illustrates a DMRS configuration 1 in a 5G or NR system, which is a pattern based on a comb. According to the DMRS configuration 1, one or more symbols may be supported in one front-located DMRS. Also, up to eight orthogonal DMRS ports may be supported by using a comb 2, four cyclic shifts, and a time domain orthogonal cover code (TD-OCC).

FIG. 16 illustrates a DMRS configuration 2 in a 5G or NR system, which is a pattern based on a frequency domain orthogonal cover code (FD-OCC). The DMRS configuration 2 has a lower reference signal density than the DMRS configuration 1. In the DMRS configuration 2, one or two symbols may be supported in one front-loaded DMRS like in the DMRS configuration 1, and up to 12 orthogonal DMRS ports may be supported by combining the FD-OCC with the TD-OCC.

In order to support such a DMRS pattern, an RRC configuration about how many additional DMRSs are to be configured in addition to a front-loaded DMRS may be supported. In addition, a configuration such as the maximum number of supported data transmission layers or the number of front-loaded DMRS symbols may be supported through RRC.

In addition to the RRC configuration, the number of antenna ports scheduled through DCI and the number thereof, a scrambling ID (SCID), and the number of antenna ports simultaneously scheduled to other terminals or a CDM group of ports may be indicated. In this case, the scheduled SCID is indicated through a DCI field, and the number of scheduled antenna ports and the CDM group simultaneously scheduled to other terminals are indicated together through one DCI field. Table 15 is a DMRS indication table when a DMRS configuration 1 and one codeword are used.

TABLE 15

| | One Codeword: Codeword 0 enabled, Codeword 1 disabled | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

In an NR system based on a DMRS, in order to improve channel estimation performance, how to bundle a DMRS pattern transmitted to a terminal through RRC, MAC CE and DCI in terms of a frequency resource may be configured. In the NR system, the terminal may transmit a size of a precoding resource block group (PRG) that is a PRB bundling size necessary to decode data through RRC and DCI.

In a 5G or NR system, in order to support a PRB bundling operation, an RRC configuration for dynamic PRG indication support through DCI may be supported. Table 16 shows an RRC configuration for PRB bundling.

TABLE 16

```
-- ASN1START
-- TAG-PDSCH-CONFIG-START
PDSCH-Config ::=          SEQUENCE {
    ...
    prb-BundlingType            CHOICE {
        staticBundling              SEQUENCE {
            bundleSize                  ENUMERATED { n4, wideband }
        },
        dynamicBundling             SEQUENCE {
            bundlesizeSet1              ENUMERATED { n4, wideband, n2-wideband, n4-wideband }     OPTIONAL, -- Need S
            bundleSizeSet2              ENUMERATED { n4, wideband }
        }
    },
    ...
}
-- TAG-PDSCH-CONFIG-STOP
-- ASN1STOP
```

Based on the RRC configuration, the following configuration candidates may be indicated as a PRG necessary to receive data through DCI to a base station. When staticBundling is configured, only one RRC-based bundling value may be configured and bundling may be performed based on the bundling value, and when dynamicBundling is configured, a determination is made according to a scheduled bandwidth (BW) and DCI based on a value configured for bundleSizeSet1 and 2. In this case, the configured value may be interpreted as follows.

1) no configured value: It is assumed that precoding is different for every two PRBs 2) n4: It is assumed that precoding is different for every four PRBs 3) Wideband: It is assumed that precoding is the same for PRBs where data is allocated to the terminal 4) n2-wideband: A determination is made according to a scheduled BW from among 2 PRBs and wideband 5) n4-wideband: A determination is made according to a scheduled BW from among 4 PRBs and wideband In this case, PDSCH-Config for configuring bundling may be configured for each bandwidth part (BWP) as shown in Table 17.

rations may not be different for each transmission point. However, the disclosure is not limited to the example.

The BWP configuration method 2 is a method of individually using a BWP configuration for each transmission point or codeword. The BWP configuration method 2 has advantages in that NC-JT performance may be optimized according to circumstances because a BWP resource location and PDCCH and PDSCH configurations may be different for each transmission point.

The BWP configuration method 3 is a method of introducing a new BWP configuration including a BWP pair to NC-JT. In the BWP configuration method 1, additional hardware necessary for the terminal may be minimized and hardware burden of the terminal may be reduced but flexibility during use may be reduced, and in the BWP configuration method 2, flexibility may be high but hardware complexity increases because all BWP combinations for codewords 1 and 2 have to be considered by the terminal. Accordingly, the hardware burden of the terminal may be minimized by specifying the combination of the BWP configuration methods 1 and 2 in advance.

Specific parameters such as subcarrierspacing and cyclicPrefix which could place a heavy hardware burden on

TABLE 17

```
BWP ::=                      SEQUENCE {
        locationAndBandwidth           INTEGER (0..37949),
        subcarrierSpacing              SubcarrierSpacing,
        cyclicPrefix         ENUMERTAED { extended }
}
...
BWP-Downlink ::=             SEQUENCE {
        bwp-Id               BW-Id,
        bwp-Common                     BWP-DownlinkCommon
        bwp-Dedicated                  BWP-DownlinkDedicated
        ...
}
BW-DownlinkCommon ::=        SEQUENCE {
        genericParameters    BWP,
        pdcch-ConfigCommon   SetUpRelease { PDCCH-ConfigCommon }
        pdsch-ConfigCommon   SetUpRelease { PDSCH-ConfigCommon }
        ...
}
BWP-DownlinkDedicated ::=    SEQUENCE {
        pdcch-Config    SetUpRelease { PDCCH-Config }
        pdsch-Config    SetUpRelease { PDSCH-Config }
        sps-Config               SetUpRelease { SPS-Config }
        radioLinkMonitorConfig   SetUpRelease {
RadioLinkMonitorConfig }                              OPTIONAL, -- Need M
        ...
}
```

A BWP configuration may include various configurations such as a BWP location and a BW, a subcarrier spacing, a cylic prefix (CP), and a PDCCH as well as a PDSCH transmission-related configuration. Accordingly, in order to support NC-JT, the following RRC configuration methods may be considered.

BWP configuration method 1: An existing BWP configuration is used in NC-JT

BWP configuration method 2: A BWP configuration is individually used for each transmission point or codeword BWP configuration method 3: A new BWP configuration including a BWP pair is introduced to NC-JT The BWP configuration method 1 is a method of using an existing BWP configuration in NC-JT. The BWP configuration method 1 has advantages in that additional hardware support by the terminal is not necessary because there is the least difference from the existing configuration. However, a BWP resource location and PDCCH and PDSCH configuthe terminal when using the BWP configuration methods 2 and 3 may be shared or may be configured to be the same value. Accordingly, the terminal may support an operation of taking the parameters from one BWP configuration and using the parameters in another BWP configuration, or when the same value is not configured, disregarding the configuration.

The following methods may be considered to transmit scheduled DCI information through PDCCH during NC-JT support.

DCI transmission method 1: NC-JT scheduling through one piece of DCI

DCI transmission method 2: NC-JT scheduling through a plurality of pieces of independent DCI DCI transmission method 3: NC-JT scheduling through one piece of independent DCI and a plurality of pieces of dependent DCI The DCI transmission method 1 is an NC-JT scheduling method through one piece of DCI.

Figure 17:
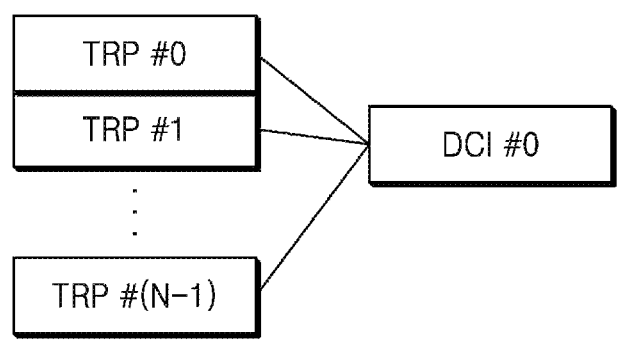
FIG. 17 illustrates a non-coherent joint transmission (NC-JT) scheduling method through one piece of downlink control information (DCI), according to an embodiment of the disclosure.

FIG. 17 illustrates an NC-JT scheduling method through one piece of DCI according to an embodiment of the disclosure.

Referring to FIG. 17, the DCI transmission method 1 is a method of transmitting one piece of DCI in which all information about an MCS and a hybrid automatic repeat request (HARM) and resource allocation information about a plurality of transmission points or codewords are included. The DCI transmission method 1 has low scheduling flexibility and low DCI coverage but has advantages in that DCI of a plurality of points may be transmitted at once and a case where some are not transmitted may not occur.

The DCI transmission method 2 is an NC-JT scheduling method through a plurality of pieces of independent DCI.

Figure 18:
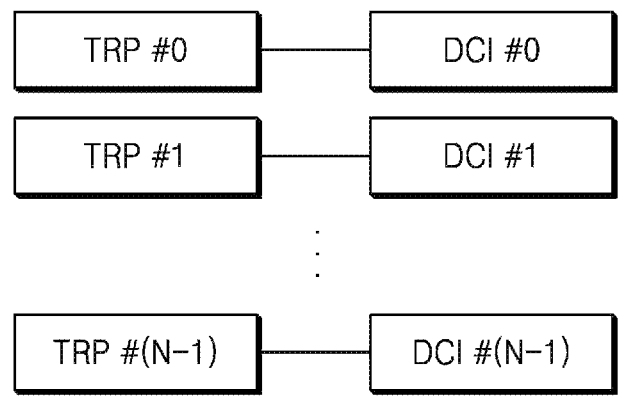
FIG. 18 illustrates an NC-JT scheduling method through a plurality of pieces of independent DCI, according to an embodiment of the disclosure.

FIG. 18 illustrates an NC-JT scheduling method through a plurality of pieces of independent DCI according to an embodiment of the disclosure.

Referring to FIG. 18, the DCI transmission method 2 has advantages in that because each DCI individually schedules a PDSCH of each transmission point or codeword, a terminal may receive NC-JT scheduling of a base station based on existing hardware for one transmission point and each scheduling may be independently and flexibility supported. However, it may be necessary to consider scheduling of a different time and frequency resource for each codeword, and terminal implementation complexity may increase according to the flexibility of independent DCI.

The DCI transmission method 3 is a method of supporting NC-JT scheduling through one piece of independent DCI and one piece of dependent DCI.

Figure 19:
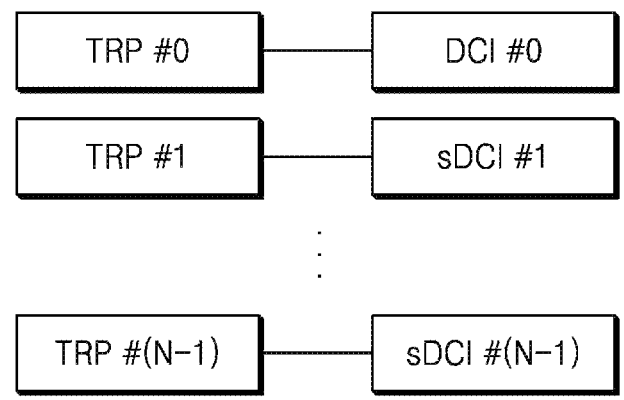
FIG. 19 illustrates an NC-JT scheduling method through independent DCI and dependent DCI, according to an embodiment of the disclosure.

FIG. 19 illustrates an NC-JT scheduling method through independent DCI and dependent DCI according to an embodiment of the disclosure.

Referring to FIG. 19, as described above, when independent DCI is individually supported, the implementation complexity of the terminal may increase due to the flexibility of the independent DCI. Accordingly, when one piece of independent DCI and additional dependent DCI are supported, independence may be minimized and a flexible operation may be performed but when some pieces of DCI are not decoded, especially, when the independent DCI is not decoded, it is impossible to decode other DCI.

One or more DCI transmission methods may be supported. For example, the terminal may support both a single DCI-based transmission method (e.g., the DCI transmission method 1) and a multiple DCI-based transmission method (e.g., the DCI transmission method 2 or 3 or both the DCI transmission methods 2 and 3). The terminal may report whether the terminal supports each transmission method (e.g., the DCI transmission method 1, 2, or 3) to the base station, and the base station may select and use a DCI transmission method suitable for the implementation or operation of the base station.

Also, according to an embodiment of the disclosure, a different BWP configuration method may be supported according to a DCI transmission method. For example, for the DCI transmission method 1 that is based on independent DCI or the DCI transmission method 3 including the combination of independent DCI and dependent DCI, an optimized BWP configuration including a BWP pair may be introduced by using the BWP configuration method 3 because scheduling between transmission points or codewords is not independent but is independent, and for the transmission method 2 using independent DCI, an existing BWP configuration may be used as it is in NC-JT by using the BWP configuration method 1. Alternatively, for the DCI transmission method 1, a new BWP configuration may be introduced by using the BWP configuration method 3, and for the DCI transmission method 3, a BWP configuration may be individually used for each transmission point or codeword by using the BWP configuration method 2.

Even when the BWP configuration methods and the DCI transmission methods are used, it may be necessary to apply PRB bundling in a downlink and a downlink DMRS to improve DMRS channel estimation performance.

PRB bundling support method 1 in NC-JT: A different PRB bundling indication method and a different PRB bundling size are supported for each codeword (transport block) or transmission point PRB bundling support method 2 in NC-JT: The same PRB bundling indication method is supported for each codeword (transport block) or transmission point, but a different PRB bundling size is supported PRB bundling support method 3 in NC-JT: A different PRB bundling indication method is supported for each codeword (transport block) or transmission point, but the same PRB bundling size is supported PRB bundling support method 4 in NC-JT: The same PRB bundling indication method and the same PRB bundling size are supported for each codeword (transport block) or transmission point The PRB bundling support method 1 in NC-JT is a method of supporting a different PRB bundling indication method and a different PRB bundling size for each codeword (transport block) or transmission point. A different PRB bundling indication method or a different PRB bundling size may be supported by reflecting a different channel condition or transmission scheme for each transmission point by supporting a PRB bundling configuration as in Table 16 and a DCI indication based on the PRB bundling configuration for each codeword or transmission point.

For example, a PRB bundling size may be configured through RRC in the case of codeword 1, and an indication method such as an indication using DCI may also be changed in the case of codeword 2, and the PRB bundling size for each codeword may be 2 PRBs in the case of codeword 1 and may be wideband in the case of codeword 2. Although the method may be applied to all of the above BWP configuration methods and DCI transmission methods, because a plurality of codewords or transmission points independently operate, the method may be more suitable for a configuration method using an independent or codeword-specific BWP configuration such as the BWP configuration method 1 or the BWP configuration method 2 and multiple DCI-based scheduling such as the DCI transmission method 2 or the DCI transmission method 3.

The PRB bundling support method 2 in NC-JT is a method of supporting the same PRB bundling indication method and a different PRB bundling size for each codeword (transport block) or transmission point. One terminal may be difficult to support a plurality of indication methods, and in particular, it may be difficult to implement the terminal because a PRB bundling size is dynamically changed in a DCI-based indication method. Such a difficulty may be increased when a plurality of codewords are received at a plurality of transmission points.

Accordingly, the reception complexity of the terminal may be reduced and simple use may be possible by using the same PRB bundling indication method, and a transmission technology difference or a channel condition difference for each transmission point may be reflected by supporting a different PRB bundling size, unlike the indication method. Also, in this case, the PRB bundling indication method may use only an RRC-based configuration method. As described above, dynamically instructed on PRB bundling sizes from a plurality of transmission points and using the PRB bundling sizes may be a burden when the terminal is implemented. Accordingly, when a DCI-based indication method is not supported and NC-JT is supported, the implementation complexity for supporting NC-JT of the terminal may be reduced by always fixing to RRC. Although the PRB bundling support method may be applied to all of the BWP configuration methods and DCI transmission methods, because a plurality of codewords or transmission points independently operate, the method may be more suitable for a configuration method using an independent or codeword-specific BWP configuration such as the BWP configuration method 1 or 2 and multiple DCI-based scheduling such as the DCI transmission method 2 or 3.

The PRB bundling support method 3 in NC-JT is a method of supporting a different PRB bundling indication method and the same PRB bundling size for each codeword (transport block) or transmission point. Although one terminal may support a plurality of indication methods because it needs to receive only RRC and DCI, it may be difficult to differently apply PRB bundling to a plurality of codewords, and in particular, it may be difficult to implement the terminal because a PRB bundling size is dynamically changed in a DCI-based indication method. Accordingly, the reception complexity of the terminal may be reduced and channel estimation may be simplified and used by using the same PRB bundling size. To this end, when an RRC-based or DCI-based PRB bundling size configuration or indication of each codeword is different, the following methods may be supported.

PRB bundling size determination method 1: A determination is made according to a type of an indication signal PRB bundling size determination method 2: A determination is made according to a PRB bundling size PRB bundling size determination method 3: A determination is made according to a PRB bundling determination method The PRB bundling size determination method 1 is a method of making a determination according to a type of an indication signal. As described above, a PRB bundling size may be determined by using RRC or may be indicated by DCI. When each codeword supports a different PRB bundling size indication method during a PRB bundling size configuration or indication, a size configured using RRC may be applied to all codewords to minimize the implementation complexity of the terminal. Also, because a size indicated by DCI may be dynamically changed in consideration of a channel condition of the terminal or other terminals, the size indicated by the DCI may be prioritized to improve the scheduling flexibility of the base station.

The PRB bundling size determination method 2 is a method of making a determination according to a PRB bundling size. As described above, the PRB bundling size may be configured or indicated to be 2 PRBs, 4 PRBs, or wideband. Accordingly, an operation of prioritizing a larger PRB bundling size may be supported to ensure higher channel estimation accuracy by comparing PRB bundling sizes indicated by codewords, or an operation of prioritizing a smaller PRB bundling size may be supported to ensure a channel diversity gain.

The PRB bundling size determination method 3 is a method of making a determination according to a PRB bundling determination method. The method corresponds to a DCI-based PRB bundling indication method, and may configure n2-wideband or n4-wideband for bundleSizeSet1 during a dynamicBundling configuration and may determine which PRB bundling size is to be used according to a size of a resource scheduled by the base station to the terminal. In this case, the PRB bundling size may be recognized only when DCI is decoded and a size of a scheduling resource is secured, and thus an available time between a DMRS and DCI may be reduced. Accordingly, an explicit determination method using n4, wideband, or no configuration (2 PRBs) may be prioritized over an implicit determination method based on n2-wideband or n4-wideband. In contrast, the explicit determination method may indicate one of two PRB bundling values through DCI whereas the implicit determination method may indicate one of three PRB bundling values through DCI which supports higher flexibility, and thus a PRB bundling value indicated in the implicit determination method may be prioritized.

Also, according to an embodiment of the disclosure, the PRB bundling size determination methods may be used in combination. For example, a PRB bundling size may be first determined by using the PRB bundling size determination method 1 for each codeword, and when codewords may not determine the PRB bundling size by using the same PRB bundling indication method, the PRB bundling size may be determined according to a PRB bundling size or indication method by using the PRB bundling size determination method 2 or 3. For example, because the PRB bundling size determination method 3 may be used only when an implicit determination method is configured, the determination method 3 may be used when n2-wideband or n4-wideband is configured and the determination method 2 may be used when n2-wideband or n4-wideband is not configured.

Although the method using the combination of the PRB bundling size determination methods may be applied to all of the BWP configuration methods and the DCI transmission methods, because a plurality of codewords or transmission points independently operate, the method may be more suitable for a configuration method using an independent or codeword-specific BWP configuration such as the BWP configuration method 1 or 2 and multiple DCI-based scheduling such as the DCI transmission method 2 or 3. However, the disclosure is not limited to the above example.

The PRB bundling support method 4 in NC-JT is a method of always supporting the same PRB bundling indication method and the same PRB bundling size for each codeword (transport block) or transmission point. The method is a method of minimizing the implementation complexity of the terminal while sacrificing the scheduling flexibility of the base station. To this end, the terminal may support the efficient implementation for a channel estimator.

Although the PRB bundling support method 4 may be applied to all of the BWP configuration methods and the DCI transmission methods, because a plurality of codewords or transmission points always operate together, the method may be more suitable for a configuration method using an optimized configuration including a BWP pair such as the BWP configuration method 3 and DCI-based scheduling in which one or more pieces of DCI are associated such as the DCI transmission method 1 or 3. Also, even when a PRB bundling support method is supported, the PRB bundling indication method may use only an RRC-based configuration method. As described above, dynamically instructed on PRB bundling sizes from a plurality of transmission points and using the PRB bundling sizes may be a burden when the terminal is implemented. Accordingly, when a DCI-based indication method is not supported and NC-JT is supported, the implementation complexity for supporting NC-JT of the terminal may be reduced by always fixing to RRC.

As described above, in NR, n2-wideband or n4-wideband may be configured for bundleSizeSet1 during a dynamicBundling configuration in DCI-based PRB bundling and which PRB bundling size is to be used according to a size of a resource scheduled by the base station to the terminal may be determined. In this case, because the PRB bundling size is determined according to the size of the scheduling resource, it is unclear which codeword's PRB bundling size is determined according to which scheduled resource. Accordingly, the PRB bundling size may be determined by using the following methods in NC-JT.

PRB bundling size implicit determination method 1 in NC-JT: A PRB bundling size implicit determination method is not supported in NC-JT.

PRB bundling size implicit determination method 2 in NC-JT: The same resource is always scheduled to all codewords in NC-JT.

PRB bundling size implicit determination method 3 in NC-JT: A determination is made by considering a union of resources occupied by all codewords as a scheduling resource in NC-JT.

PRB bundling size implicit determination method 4 in NC-JT: A determination is made by considering an intersection of resources occupied by all codewords as a scheduling resource in NC-JT.

PRB bundling size implicit determination method 5 in NC-JT: A determination is made by considering a resource scheduled to a specific or individual codeword in NC-JT.

PRB bundling size implicit determination method 6 in NC-JT: A different implicit determination method is used, unlike in generation transmission, during an implicit determination in NC-JT.

The PRB bundling size implicit determination method 1 in NC-JT is a method of not supporting a PRB bundling size implicit determination method in NC-JT. When an implicit determination method is used during NC-JT support, a bundling size may be determined after all DCI for scheduling of the terminal is decoded, and thus a delay time is increased and the implementation complexity of a terminal channel estimator is increased. Accordingly, when the base station does not configure n2-wideband or n4-wideband for budleSizeSet1 or the terminal configures n2-wideband or n4-wideband for budleSizeSet1, channel estimation may be supported by disregarding the configuration or using a configuration of another codeword.

The PRB bundling size implicit determination method 2 in NC-JT is a method of always scheduling the same resource to all codewords in NC-JT. The PRB bundling size implicit determination method 2 may address the unclearness of a scheduling resource and may re-use the implementation previously used in one transmission point or codeword support, by allowing all codewords to always occupy the same frequency or time/frequency resource.

The PRB bundling size implicit determination method 3 in NC-JT is a method of making a determination by considering a union of resources occupied by all codewords as a scheduling resource in NC-JT. When codewords occupy different frequency or time/frequency resources, all resources to which the terminal is actually scheduled are a union of resources to which codewords are allocated. Accordingly, a PRB bundling size may be supported to be determined based on a union of resources occupied by all codewords.

The PRB bundling size implicit determination method 4 in NC-JT is a method of making a determination by considering an intersection of resources occupied by all codewords as a scheduling resource. When codewords occupy different frequency or time/frequency resources, although all resources to which the terminal is actually scheduled are a union of resources to which codewords are allocated, a portion where NC-JT is actually performed may be an intersection of resources to which codewords are allocated and it may be determined that a frequency resource is multiplexed in other portions. Accordingly, a PRB bundling size may be supported to be determined based on an intersection of resources occupied by all codewords.

The PRB bundling size implicit determination method 5 in NC-JT is a method of making a determination by considering a resource scheduled to a specific or individual codeword in NC-JT. When a resource scheduled to an individual codeword is considered, an implicit determination may be supported according to a BWP size and a resource scheduled for each codeword. Also, a PRB bundling size may be implicitly determined based on a resource scheduled to a specific codeword by specifying a codeword (e.g., codeword 0) used for implicit determination in the standard or configuring or indicating a codeword to be used for implicit determination by using signaling such as RRC or MAC CE in order to consider the resource scheduled to the specific codeword.

The PRB bundling size implicit determination method 6 in NC-JT is a method of using a different implicit determination method, unlike in general transmission, during implicit determination in NC-JT. As described above, in NR, when n2-wideband or n4-wideband is configured for budleSizeSet1 and a scheduling resource exceeds half of a BWP size, the PRB Bundling size is recognized (determined) as 2 PRBs or 4 PRBs. However, because it may be difficult to determine a scheduling size in NC-JT and the same channel estimator may not be used even when two schedulings are substantially the same, a determination may be made based on the following different implicit information.

Multi-user multiple-input multiple-output (MU-MIMO) transmission information: In NR, not only a terminal receiving data through DCI but also terminals receiving data together may be instructed on information about a DMRS port or a CDM group of a DMRS and may determine which candidate resource is to be used based on the information about the DMRS port or the CDM group of the DMRS. When the base station supports MU-MIMO transmission, because transmission power of the base station has to be divided and transmitted to a plurality of terminals in order to simultaneously transmit data to the terminals, an SINR of the DMRS may be reduced and thus DMRS channel estimation performance may be reduced. In this case, it is necessary to improve DMRS channel estimation performance by using a larger PRG size. However, in single-user MIMO (SU-MIMO) transmission, because data is transmitted only to one terminal, DMRS channel estimation may be performed by using a smaller PRG size. Tables 18, 19, and 20 show such an operation of the terminal.

TABLE 18

| DCI = 0 | DCI = 1 | |
| --- | --- | --- |
| Explicit determination | Implicit determination | |
| PRG | PRG (SU-MIMO) | PRG (MU-MIMO) |
| 2 | 4 | Scheduled BW |

TABLE 19

| DCI = 0<br>Explicit<br>determination | DCI = 1<br>Implicit determination | |
|---|---|---|
| PRG | PRG (No co-scheduled CDM group) | PRG (Co-scheduled CDM group exists) |
| 2 | 4 | Scheduled BW |

TABLE 20

| DCI = 0<br>Explicit<br>determination | DCI = 1<br>Implicit determination | |
|---|---|---|
| PRG | PRG (No co-scheduled DMRS port) | PRG (Co-scheduled DMRS port exists) |
| 2 | 4 | Scheduled BW |

Although an indication between SU-MIMO/MU-MIMO, No co-scheduled CDM group/Co-scheduled CDM group, and No co-scheduled DMRS port/Co-scheduled DMRS port is shown in Tables 18, 19, and 20, classification may be made according to the number of layers allocated to other terminals, the number of co-scheduled CDM groups of other terminals, or the number of co-scheduled DMRS ports.

For example, a small PRG size is used when up to two co-scheduled CDM groups are indicated, and a large PRG size is used when three or more are indicated. The number of layers, the number of CDM groups, and the number of DMRS ports may be defined as fixed numbers in the standard, or may be configured by the base station through RRC.

Although the number of layers, the number of co-scheduled CDM groups, and the number of DMRS ports for data transmission of other terminals indicated to the terminal are described in the above embodiments of the disclosure, the number of layers, the number of co-scheduled CDM groups, and the number of DMRS ports allocated to both the terminal and other terminals may be defined in addition to the above embodiments of the disclosure.

DMRS indication information: As in a DCI field of Tables 18 through 20 and the above RRC configuration, the base station transmits data to the terminal and indicates layer and DMRS port allocation information for the data transmission to the terminal. PRG size support may vary according to such DMRS indication information. This criterion may include the number of OFDM symbols of an indicated front-loaded DMRS, the number of additional DMRSs, and the number of layers scheduled to the terminal. Tables 21, 22, 23, and 24 show such support.

TABLE 21

| DCI = 0<br>Explicit<br>determination | DCI = 1<br>Implicit determination | |
|---|---|---|
| PRG | # of front-loaded DMRS OFDM symbol = 1 | # of front-loaded DMRS OFDM symbol = 2 |
| 2 | 4 | Scheduled BW |

TABLE 22

| DCI = 0 | DCI = 1 | |
|---|---|---|
| Explicit determination | Implicit determination | |
| PRG | PRG (No additional DMRS symbol) | PRG (Additional DMRS symbol exists) |
| 2 | 4 | Scheduled BW |

TABLE 23

| DCI = 0 | DCI = 1 | |
|---|---|---|
| Explicit determination | Implicit determination | |
| PRG | PRG (rank <= 2) | PRG (rank > 2) |
| 2 | 4 | Scheduled BW |

TABLE 24

| DCI = 0 | DCI = 1 | |
|---|---|---|
| Explicit determination | Implicit determination | |
| PRG | PRG (#CW = 2) | PRG (#CW = 1) |
| 2 | 4 | Scheduled BW |

As shown in Tables 21, 22, and 23, a PRG size may be determined based on the number of front-located OFDM symbols, the number of additional DMRSs, a transmission rank, and the number of transmission codewords. Also, although not shown in the above, an indirect PRG selection operation may be supported as follows for a DMRS type (Configuration type 1/2) of NR.

Also, the operation may allow all or some conditions from among DMRS conditions to be configured and selected by the base station through RRC.

Also, which PRG is to be used may be configured through bitmap support through RRC or MAC CE for each indication state of a DMRS indication table. Table 25 shows a bitmap configuration through RRC based on Table 21.

TABLE 25

| 0: PRG candidate #1, 1: PRG candidate #2 |
|---|
| 0001111001101000 |

A size of a bitmap may be the number of all states supported in a DMRS table or the number except reserved states, and the bitmap may be generated by first mapping an MSB from a DMRS port and layer indication field state 0 or by first mapping an LSB.

Bandwidth part size: A PRG size for receiving data may be determined according to a size of a bandwidth part that is configured for the terminal or configured and activated. Table 26 shows an example where a PRG is determined according to a BWP size.

TABLE 26

| DCI = 0 | DCI = 1 | |
|---|---|---|
| Explicit determination | Implicit determination | |
| PRG | PRG (BW part <= 26) | PRG (BW part > 27) |
| 2 | 4 | Scheduled BW |

Bandwidth part size and RRC configuration-based subband size: NR may support one of a size of a bandwidth part that is configured for the terminal or configured and activated and a subband size shown in Table 27 according to an RRC configuration ($1^{st}$ value/$2^{nd}$ value).

TABLE 27

| Bandwidth part (PRBs) | Subband size (PRBs) |
|---|---|
| <24 | N/A |
| 24-72 | 4, 8 |
| 73-144 | 8, 16 |
| 145-275 | 16, 32 |

In this case, a PRG value may be determined according to whether a $1^{st}$ value is configured to be used or a $2^{nd}$ value is configured to be used through RRC in the subband size. In this case, the PRG value may be determined based on an RRC value ($1^{st}$ value/$2^{nd}$ value). For example, in the case of the $1^{st}$ value, because frequency selective precoding is performed easily, a lower PRG value may be used, and in the case of the $2^{nd}$ value, because the subband size is large and the probability of frequency selective precoding and a frequency unit thereof are relatively large, a higher PRG value may be used.

PDCCH REG bundling size: The terminal may implicitly determine a size of a PRG necessary for PDSCH transmission based on a PRG size assumed when the terminal receives a control channel through a PDCCH.

In this case, a plurality of PRG determination methods may be supported instead of one of a plurality of implicit PRG determination methods, and the base station may configure one of the plurality of PRG determination methods to be selected and used through RRC. Also, a PRB bundling-related configuration and indication may be configured and indicated for each bandwidth part.

Figure 20:
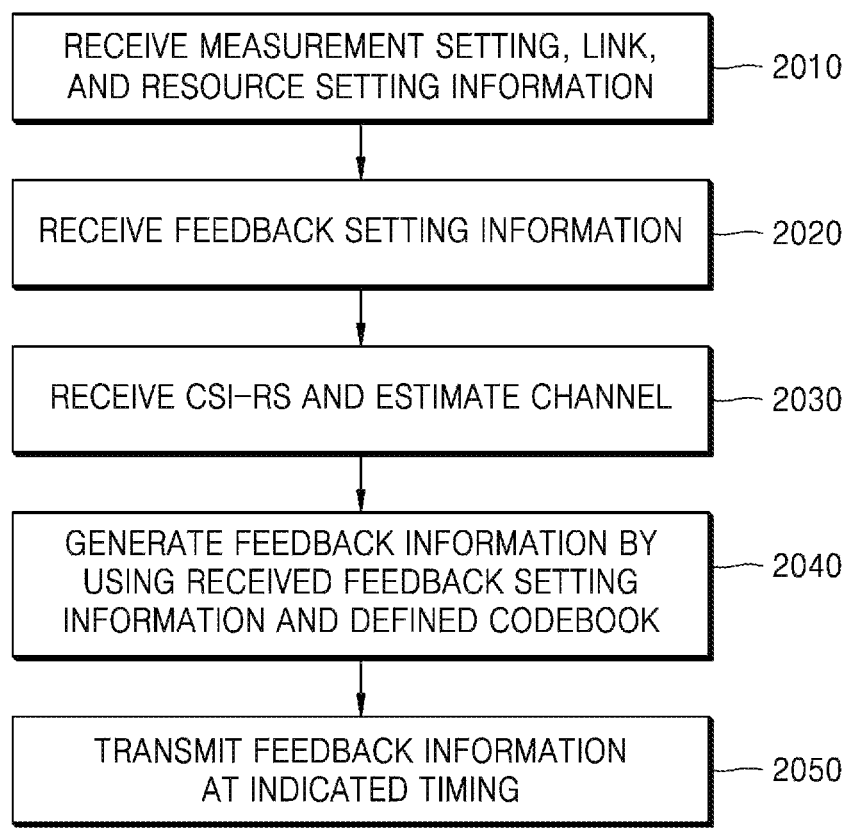
FIG. 20 is a flowchart illustrating an operation of a terminal according to an embodiment of the disclosure.

FIG. 20 is a flowchart illustrating an operation of a terminal according to an embodiment of the disclosure.

Referring to FIG. 20, in operation 2010, a terminal receives measurement setting and resource setting information. Information about a reference signal for channel measurement may be included in the measurement setting and resource setting information. For example, the measurement setting and resource setting information may include at least one of a reference signal type, the number of ports for the reference signal, a codebook type, N1 and N2 (i.e., the number of antennas for each dimension), O1 and O2 (i.e., the number of oversampling factors for each dimension), one subframe config for transmitting a plurality of CSI-RSs, a plurality of resource configs for configuring locations, codebook subset restriction-related information, CSI reporting-related information (CQI table type or CQI reliability), a CSI-process index, a candidate number for a timing indication between aperiodic channel state reporting triggering and aperiodic channel state reporting, or transmission power information (PC).

In operation 2020, the terminal configures one feedback configuration information through a channel state reporting setting used in a measurement setting. The information may include information on whether to report a PMI/CQI, a period and offset, an RI period and offset, a CRI period and offset, a status of wideband/subband, a submode, a channel state reporting type, a candidate number for a timing indication between aperiodic channel state reporting trigger and aperiodic channel state reporting, etc.

In operation 2030, when the terminal receives the reference signal based on the information, the terminal estimates a channel between an antenna of a base station and a reception antenna of the terminal based on the reference signal.

In operation 2040, the terminal may generate feedback information such as a rank, a PMI, and a CQI by using a received feedback configuration based on the estimated channel and may select an optimal CRI based on the feedback information such as the rank, the PMI, and the CQI.

In operation 2050, the terminal may transmit, to the base station, the feedback information at a feedback timing determined according to the feedback configuration of the base station or the aperiodic channel state reporting trigger, and the timing indication between the aperiodic channel state reporting trigger and the aperiodic channel state reporting.

Figure 21:
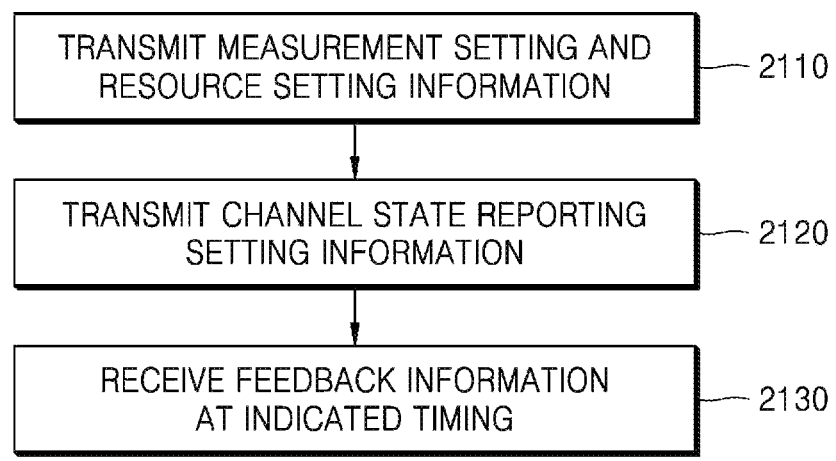
FIG. 21 is a flowchart illustrating an operation of a base station according to an embodiment of the disclosure.

FIG. 21 is a flowchart illustrating an operation of a base station according to an embodiment of the disclosure.

Referring to FIG. 21, in operation 2110, a base station transmits, to a terminal, configuration information for a channel state reporting setting and a reference signal for measuring a channel. The configuration information for the channel state reporting setting and the reference signal for measuring the channel may include at least one of a type of each reference signal, a time, a frequency resource location, a service type, a support feedback type, or a measurement subset, and may include at least one of the number of ports for the reference signal, N1 and N2, (i.e., the number of antennas for each dimension), O1 and O2 (i.e., oversampling factors for each dimension), one subframe config for transmitting a plurality of reference signals, a plurality of resource configs for configuring locations, codebook subset restriction-related information, CSI reporting-related information (CQI table type or CQI reliability), a CSI-process index, or PC to transmit the reference signal based on the configuration information for the channel state reporting setting and the reference signal for measuring the channel.

In operation 2120, the base station transmits, to the terminal, feedback configuration information based on at least one CSI-RS. The information may include at least one of a PMI/CQI period and offset, an RI period and offset, a CRI period and offset, a status of wideband/subband, a submode, a candidate number for a timing indication between aperiodic channel state reporting trigger or aperiodic channel state reporting. The base station transmits the configured CSI-RS to the terminal. The terminal estimates a channel for each antenna port and estimates an additional channel for a virtual resource based on the estimated channel. The terminal determines a feedback and generates a CRI, a PMI, an RI, and a CQI corresponding to the feedback and transmits the CRI, PMI, RI, and CQI.

In operation 2130, the base station receives feedback information from the terminal at a determined timing, and uses the feedback information to determine a channel state between the terminal and the base station.

Figure 22:
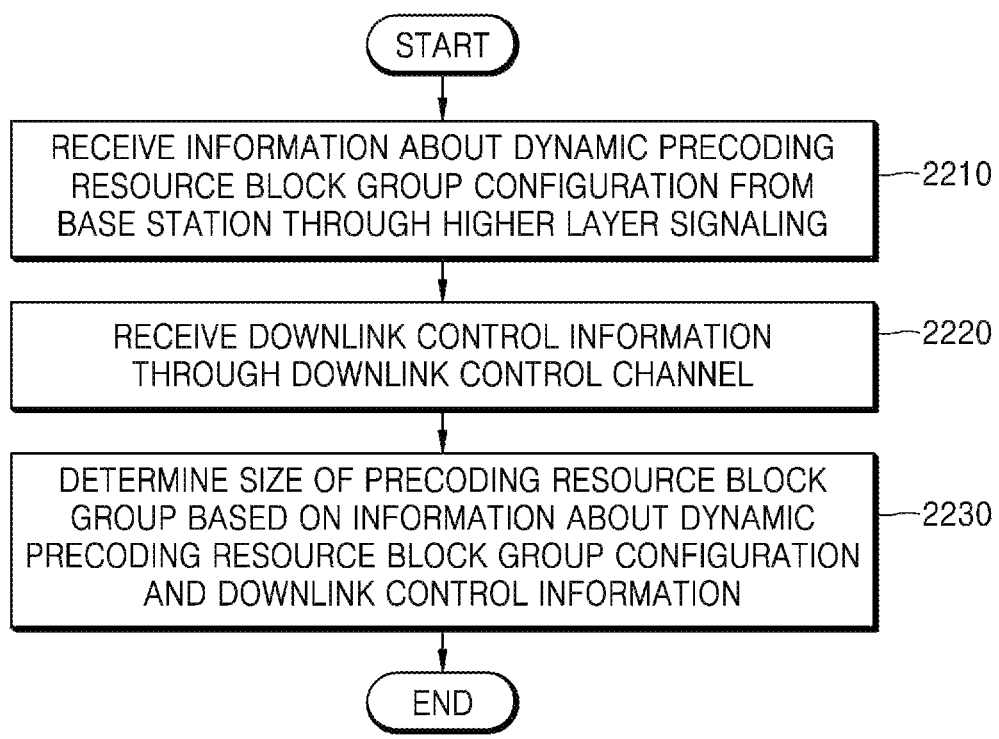
FIG. 22 is a flowchart illustrating an operating method of a terminal, according to an embodiment of the disclosure.

FIG. 22 is a flowchart illustrating an operating method of a terminal according to an embodiment of the disclosure.

Referring to FIG. 22, in operation 2210, a terminal receives, from a base station, information about a dynamic precoding resource block group configuration through higher layer signaling. In an embodiment of the disclosure, DCI may include information indicating to explicitly determine or implicitly determine a size of a precoding resource block group. Also, the DCI may include at least one information from among MU-MIMO transmission information or reference signal indication information.

According to an embodiment of the disclosure, the MU-MIMO transmission information may include at least one of whether SU-MIMO or MU-MIMO is performed, a CDM group of a reference signal received by the terminal, or port information of the reference signal received by the terminal. Also, the reference signal indication information may include at least one of the number of OFDMs for the reference signal, the number of additional reference signals, a rank, a reference signal type, or the number of transmitted codewords.

Furthermore, according to an embodiment of the disclosure, the terminal may receive a bitmap including information about the size of the precoding resource block group through higher layer signaling. Also, the terminal may receive, through higher layer signaling, information indicating a method for determining the size of the precoding resource block group from the base station.

In operation 2220, the terminal receives the DCI through a downlink control channel.

In operation 2230, the terminal determines the size of the precoding resource block group based on the DCI and the information about the dynamic precoding resource block group configuration. According to an embodiment of the disclosure, the terminal may support one downlink resource block group indication and configuration signal or may determine the size of the precoding resource block group to be applied to a plurality of codewords according to a downlink resource block group indication and configuration signal type or size determination method. When the DCI includes information indicating to implicitly determine the size of the precoding resource block group, the terminal may determine the size of the precoding resource block group based on at least one information from among the MU-MIMO transmission information or the reference signal indication information. Also, the terminal may determine the size of the precoding resource block group based on at least one of the bitmap, a bandwidth part configured for the terminal, or a bandwidth scheduled to the terminal. Also, the terminal may determine the size of the precoding resource block group based on the size of the precoding resource block group assumed when the terminal receives the downlink control channel.

Figure 23:
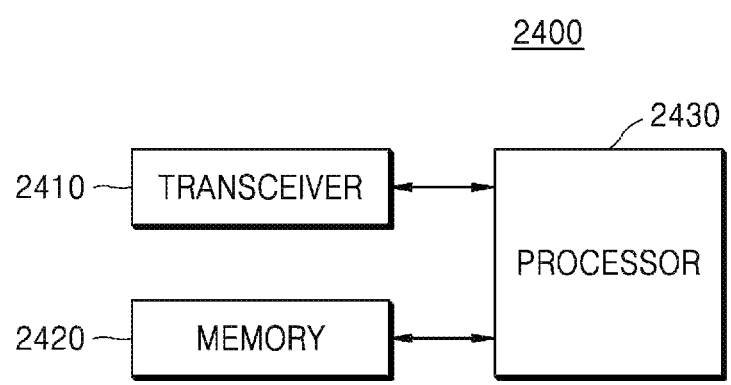
FIG. 23 is a block diagram illustrating a configuration of a terminal according to an embodiment of the disclosure.

FIG. 23 is a block diagram illustrating a configuration of a terminal according to an embodiment of the disclosure.

Referring to FIG. 23, a terminal 2400 may include a transceiver 2410, a memory 2420, and a processor 2430. The transceiver 2410, the memory 2420, and the processor 2430 of the terminal 2400 may operate according to a communication method of the terminal 2400. However, elements of the terminal 2400 are not limited to those illustrated in FIG. 23. For example, the terminal 2400 may include elements more or fewer than those illustrated in FIG. 23. In addition, the transceiver 2410, the memory 2420, and the processor 2430 may be implemented as one chip.

According to an embodiment of the disclosure, the transceiver 2410 may transmit/receive a signal to/from a base station. The signal may include control information and data. To this end, the transceiver 2410 may include an RF transmitter that up-converts and amplifies a frequency of a transmitted signal and an RF receiver that performs low-noise amplification on a received signal and down-converts a frequency. However, this is merely an example of the transceiver 2410, and elements of the transceiver 2410 are not limited to the RF transmitter and the RF receiver.

Also, according to an embodiment of the disclosure, the transceiver 2410 may receive a signal through a wireless channel, may output the signal to the processor 2430, and may transmit a signal output from the processor 2430 through the wireless channel.

According to an embodiment of the disclosure, the memory 2420 may store a program and data necessary to operate the terminal 2400. Also, the memory 2420 may store control information or data included in a signal obtained by the terminal 2400. The memory 2420 may include a storage medium such as a read-only memory (ROM), a random-access memory (RAM), a hard disc, a compact disc-ROM (CD-ROM), or a digital versatile disk (DVD), or a combination of storage media. Also, the memory 2420 may include a plurality of memories. In an embodiment of the disclosure, the memory 2420 may store a program for supporting beam-based cooperative communication.

According to an embodiment of the disclosure, the processor 2430 may control a series of processes so that the terminal 2400 operates according to the above embodiment of the disclosure. The processor 2430 may include a plurality of processors. In an embodiment of the disclosure, by executing a program stored in the memory 2420, the processor 2430 may receive information about a dynamic precoding resource block group configuration through higher layer signaling, may receive DCI through a downlink control channel, and may determine a size of the precoding resource block group based on the information about the dynamic precoding resource block group configuration and the DCI. Also, the processor 2430 may receive configuration information including information about a CQI from the base station, may determine a CQI table based on the configuration information, and may perform channel state reporting based on the CQI table.

According to an embodiment of the disclosure, the processor 2430 may control feedback information to be generated according to information allocated from the base station, and may control the transceiver 2410 to feed generated channel information back to the base station according to timing information allocated from the base station. Also, the processor 2430 may determine a time-frequency location of a resource through the feedback information and a service received from the base station, may check necessary feedback information through related CSI-RS and feedback allocation information, and may estimate a channel by using a received CSI-RS based on the feedback information.

Also, according to an embodiment of the disclosure, the processor 2430 may measure at least one reference signal received through the transceiver 2410, and may generate the feedback information according to feedback configuration information. Furthermore, the processor 2430 may control the transceiver 2410 to transmit the generated feedback information to the base station at a feedback timing according to the feedback configuration information.

According to an embodiment of the disclosure, the processor 2430 may receive the CSI-RS from the base station, may generate the feedback information based on the received CSI-RS, and may transmit the generated feedback information to the base station. In this case, the processor 2430 may select each precoding matrix for each antenna port group of the base station and may further select one additional precoding matrix based on a relationship between antennal port groups.

According to an embodiment of the disclosure, the processor 2430 may receive the CSI-RS from the base station, may generate the feedback information based on the received CSI-RS, and may transmit the generated feedback information to the base station. In this case, the processor 2430 may select one precoding matrix for all antenna port groups of the base station, and may select and report a CQI having different reliability by considering a configured CQI table type or CQI reliability. Also, the processor 2430 may receive the feedback configuration information from the base station, may receive the CSI-RS from the base station, may generate the feedback information based on the received feedback configuration information and the received CSI-RS, and may transmit the generated feedback information to the base station. In this case, the processor 2430 may receive additional feedback configuration information based on a relationship between antenna port groups and the feedback configuration information corresponding to each antenna port group of the base station.

Figure 24:
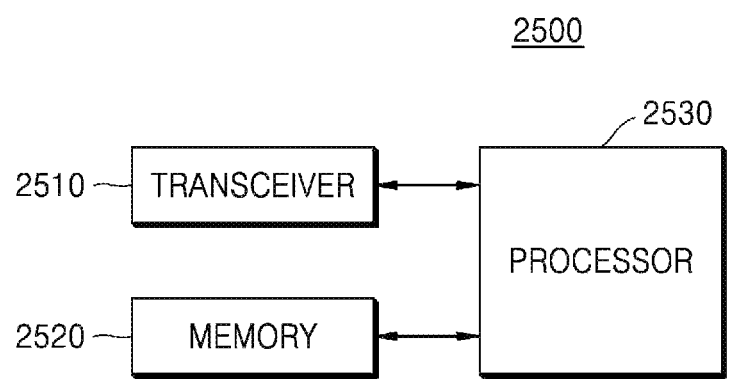
FIG. 24 is a block diagram illustrating a configuration of a base station according to an embodiment of the disclosure.

FIG. 24 is a block diagram illustrating a configuration of a base station according to an embodiment of the disclosure.

Referring to FIG. 24, a base station 2500 may include a transceiver 2510, a memory 2520, and a processor 2530. The transceiver 2510, the memory 2520, and the processor 2530 of the base station 2500 may operate according to a communication method of the base station 2500. However, elements of the base station 2500 are not limited to those illustrated in FIG. 24. For example, the base station 2500 may include elements more or fewer than those illustrated in FIG. 24. In addition, the transceiver 2510, the memory 2520, and the processor 2530 may be implemented as one chip.

According to an embodiment of the disclosure, the transceiver 2510 may transmit/receive a signal to/from a terminal. The signal may include control information and data. To this end, the transceiver 2510 may include an RF transmitter that up-converts and amplifies a frequency of a transmitted signal and an RF receiver that performs low-noise amplification on a received signal and down-converts a frequency. However, this is merely an example of the transceiver 2510, and elements of the transceiver 2510 are not limited to the RF transmitter and the RF receiver. Also, the transceiver 2510 may receive a signal through a wireless channel, may output the signal to the processor 2530, and may transmit a signal output from the processor 2530 through the wireless channel.

According to an embodiment of the disclosure, the transceiver 2510 may transmit/receive data, a reference signal, and feedback information to/from the terminal. The transceiver 2510 transmits a CSI-RS to the terminal through an allocated resource under the control of the processor 2530, and receives a feedback about channel information from the terminal. Also, a reference signal is transmitted based on a CRI, a rank, a part of PMI information, CQI, etc., obtained from channel state information transmitted by the terminal.

According to an embodiment of the disclosure, the memory 2520 may store a program and data necessary to operate the base station 2500. Also, the memory 2520 may store control information or data included in a signal obtained by the base station 2500. The memory 2520 may include a storage medium such as a ROM, a RAM, a hard disc, a CD-ROM, or a DVD, or a combination of storage media. Also, the memory 2520 may include a plurality of memories. In an embodiment of the disclosure, the memory 2520 may store a program for supporting beam-based cooperative communication.

According to an embodiment of the disclosure, the processor 2530 may control a series of processes so that the base station 2500 operates according to the above embodiment of the disclosure. The processor 2530 may transmit/receive control information by executing a program stored in the memory 2520. In an embodiment of the disclosure, the processor 2530 allocates, to the terminal, a CSI-RS resource for channel estimation and a related configuration for obtaining resource information and allocates a feedback resource and a feedback timing to the terminal. Also, the processor 2530 allocates a feedback configuration and a feedback timing in order to prevent collisions between feedbacks from multiple terminals and receives and analyzes the feedback information configured at the timing.

According to an embodiment of the disclosure, the processor 2530 may control the transceiver 2510 to transmit configuration information about each of at least one reference signal to the terminal, or may generate at least one reference signal. Also, the processor 2530 may control the transceiver 2510 to transmit feedback configuration information for generating the feedback information according to a measurement result to the terminal. Also, the processor 2530 may control the transceiver 2510 to transmit at least one reference signal to the terminal and receive the feedback information transmitted from the terminal at the feedback timing according to the feedback configuration information. Also, the processor 2530 may transmit the feedback configuration information to the terminal, may transmit the CSI-RS to the terminal, and may receive, from the terminal, the feedback information (information including a CQI having different reliability by considering a configured CQI table type or CQI reliability) generated based on the feedback configuration information and the CSI-RS. In this case, the processor 2530 may transmit additional feedback configuration information based on a relationship between antenna port groups and the feedback configuration information corresponding to each antenna port group of the base station. Also, the processor 2530 may transmit a CSI-RS beamformed based on the feedback information to the terminal, and may receive, from the terminal, the feedback information generated based on the CSI-RS. According to an embodiment of the disclosure, the base station having a large number of transmission antennas of a two-dimensional array structure may prevent excessive feedback resource allocation for CSI-RS transmission and may prevent an increase in the channel estimation complexity of the terminal, and the terminal may effectively measure all channels for a large number of transmission antennas, may compose feedback information based on a measurement result, and may notify the base station of the feedback information.

Figure 25:
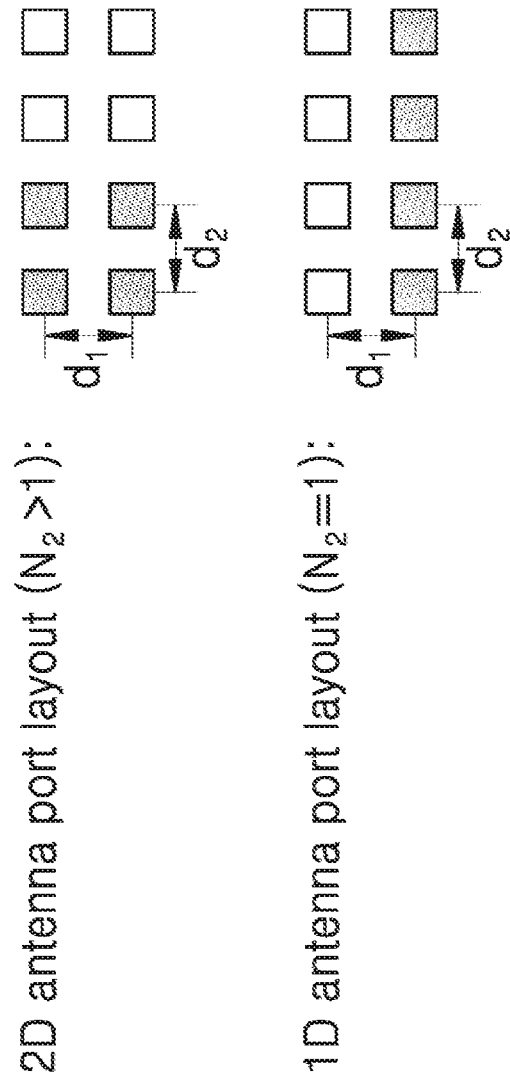
FIG. 25 is a block diagram illustrating a beam group pattern according to an embodiment of the disclosure.

FIG. 25 is a diagram illustrating a beam group pattern according to an embodiment of the disclosure.

As described above, the disclosure relates to a wireless communication system, and more particularly, relates to operations of a terminal and a base station necessary when the base station configures and indicates a PRG size to the terminal during data and reference signal transmission using NC-JT. The disclosure relates to operations of a terminal and a base station necessary when the base station configures and indicates beam information to the terminal during NC-JT transmission in which a plurality of transmission points transmit each codeword to one terminal. In NR, the base station may transmit each codeword for each TRP to the terminal to ensure higher performance. In this case, existing PDCCH and PDSCH configurations indicated based on a single TRP may be redundant and a mismatch may occur between the configurations. The disclosure provides a method of defining a configuration specialized for NC-JT for addressing such a mismatch and a priority for addressing the mismatch.

According to the disclosure, a wireless communication system may efficiently provide a service.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a terminal, of supporting non-coherent joint transmission in a wireless communication system, the method comprising:
receiving information about a precoding resource block group configuration including a first precoding resource block group configuration information corresponding to at least one transmission block received from a first transmission and reception point (TRP) and a second precoding resource block group configuration information corresponding to at least one transmission block received from a second TRP; and
determining sizes of precoding resource block groups applied to a plurality of transmission blocks received from the first TRP and the second TRP based on at least one of the first precoding resource block group configuration information or the second precoding resource block group configuration information,
wherein the determining of the sizes of the precoding resource block groups comprises:
in response to the sizes of the precoding resource block groups applied to the plurality of transmission blocks being differently indicated by the first precoding resource block group configuration information and the second precoding resource block group configuration information, selecting one of precoding resource block group configuration information from the first precoding resource block group configuration information and the second precoding resource block group configuration information and determining the sizes of the precoding resource block groups applied to all of the plurality of transmission blocks based on the selected precoding resource block group configuration information.

2. The method of claim 1, further comprising:
receiving configuration information about one bandwidth part (BWP); and
receiving the plurality of transmission blocks based on configuration information about the one BWP.

3. The method of claim 1, further comprising:
receiving a plurality of pieces of bandwidth part (BWP) configuration information; and
receiving the plurality of transmission blocks based on each of the plurality of pieces of BWP configuration information,
wherein the plurality of transmission blocks are received through a same time-frequency resource.

4. The method of claim 1, further comprising:
receiving scheduling information of the plurality of transmission blocks indicated from a plurality of TRPs through one piece of downlink control information or a plurality of pieces of downlink control information,
wherein the plurality of transmission blocks are received through a same time-frequency resource.

5. The method of claim 1, wherein the sizes of the precoding resource block groups correspond to physical resource block bundling sizes of the plurality of transmission blocks.

6. The method of claim 1, wherein the receiving of the information about the precoding resource block group configuration comprises receiving one piece of configuration information about one precoding resource block group applied to the plurality of transmission blocks or a plurality of pieces of configuration information about a plurality of precoding resource block groups respectively applied to the plurality of transmission blocks.

7. The method of claim 1,
wherein the information about the precoding resource block group configuration comprises information about a size determination method of a precoding resource block group,
wherein the size determination method of the precoding resource block group comprises at least one of a size explicit determination method or a size implicit determination method, and
wherein the size explicit determination method comprises determining a size of the precoding resource block group based on an explicitly defined size, and the size implicit determination method comprises determining the size of the precoding resource block group based on a set certain value or a resource to which at least one transmission block from among the plurality of transmission blocks is scheduled.

8. The method of claim 7, wherein the determining of the sizes of the precoding resource block groups comprises determining the sizes of the precoding resource block groups by using the size explicit determination method, wherein the size implicit determination method is not supported.

9. The method of claim 7, wherein, in response to the plurality of transmission blocks being received from a plurality of TRPs, the plurality of transmission blocks are scheduled to occupy at least one of a same frequency resource or a same time-frequency resource.

10. The method of claim 7, wherein the resource to which at least one transmission block from among the plurality of transmission blocks is scheduled is an intersection or a union of resources occupied by the plurality of transmission blocks, or a resource to which a certain transmission block is scheduled.

11. The method of claim 7, wherein the size implicit determination method comprises determining the size of the precoding resource block group by considering at least one of multi-user multiple-input multiple-output (MU-MIMO) transmission information, demodulation reference signal (DMRS) indication information, bandwidth part (BWP) size information, or physical downlink control channel (PDCCH) resource element group (REG) bundling size information, instead of scheduling the resource.

12. The method of claim 6, wherein the selecting of one of precoding resource block group configuration information comprises selecting one of precoding resource block group configuration information based on a size of a precoding resource block group applied to one of the plurality of transmission blocks indicated by the first precoding resource block group configuration information and the second precoding resource block group configuration information, or selecting one of precoding resource block group configuration information based on size determination methods indicated by the first precoding resource block group configuration information and the second precoding resource block group configuration information.

13. A terminal for supporting non-coherent joint transmission in a wireless communication system, the terminal comprising:
a transceiver; and
at least one processor coupled with the transceiver and configured to:
receive information about a precoding resource block group configuration including a first precoding resource block group configuration information corresponding to at least one transmission block received from a first transmission and reception point (TRP) and a second precoding resource block group configuration information corresponding to at least one transmission block received from a second TRP,
determine sizes of precoding resource block groups applied to a plurality of transmission blocks received from the first TRP and the second TRP based on at least one of the first precoding resource block group configuration information or the second precoding resource block group configuration information,
wherein in response to the sizes of the precoding resource block groups applied to the plurality of transmission blocks being differently indicated by the first precoding resource block group configuration information and the second precoding resource block group configuration information, the processor is further configured to:
select one of precoding resource block group configuration information from the first precoding resource block group configuration information and the second precoding resource block group configuration information and determine the sizes of the precoding resource block groups applied to all of the plurality of transmission blocks based on the selected precoding resource block group configuration information.

14. The terminal of claim 13, wherein the at least one processor is further configured to:
receive configuration information about one bandwidth part (BWP), and
receive the plurality of transmission blocks based on the configuration information about the one BWP.

15. The terminal of claim 13, wherein the at least one processor is further configured to:
receive a plurality of pieces of bandwidth part (BWP) configuration information, and
receive the plurality of transmission blocks based on each of the plurality of pieces of BWP configuration information, and
wherein the plurality of transmission blocks are received through a same time-frequency resource.

16. The terminal of claim 13,
wherein the at least one processor is further configured to receive scheduling information of the plurality of transmission blocks indicated from a plurality of TRPs through one piece of downlink control information or a plurality of pieces of downlink control information, and
wherein the plurality of transmission blocks are received through a same time-frequency resource.

17. The terminal of claim 13, wherein the sizes of the precoding resource block groups correspond to physical resource block bundling sizes of the plurality of transmission blocks.

18. The terminal of claim 13, wherein the at least one processor is further configured to receive one piece of configuration information about one precoding resource block group applied to the plurality of transmission blocks or receive a plurality of pieces of configuration information about a plurality of precoding resource block groups respectively applied to the plurality of transmission blocks.

19. The terminal of claim 13,
wherein the information about the precoding resource block group comprises information about a size determination method of a precoding resource block group,
wherein the size determination method of the precoding resource block group comprises at least one of a size explicit determination method or a size implicit determination method, and wherein the size explicit determination method comprises determining a size of the precoding resource block group based on an explicitly defined size, and the size implicit determination method comprises determining the size of the precoding resource block group based on a set certain value or a resource to which at least one transmission block from among the plurality of transmission blocks is scheduled.

* * * * *